United States Patent
Seo et al.

(10) Patent No.: US 10,945,144 B2
(45) Date of Patent: Mar. 9, 2021

(54) METHOD FOR MONITORING CONTROL SIGNAL OF TERMINAL IN WIRELESS COMMUNICATION SYSTEM AND TERMINAL USING THE SAME

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/528,068

(22) Filed: Jul. 31, 2019

(65) Prior Publication Data

US 2020/0045569 A1 Feb. 6, 2020

(30) Foreign Application Priority Data

Jul. 31, 2018 (KR) .................. 10-2018-0089551

(51) Int. Cl.
*H04L 12/28* (2006.01)
*H04W 24/08* (2009.01)
(Continued)

(52) U.S. Cl.
CPC ......... *H04W 24/08* (2013.01); *H04W 56/001* (2013.01); *H04W 72/042* (2013.01); *H04W 72/046* (2013.01); *H04W 72/10* (2013.01)

(58) Field of Classification Search
CPC ......... H04W 72/0446; H04W 72/0453; H04W 72/042; H04W 74/002; H04L 5/0053; H04L 5/0063; H04J 11/0079
(Continued)

(56) References Cited

U.S. PATENT DOCUMENTS 10,587,363 B2 * 3/2020 Zhou .................... H04W 24/10
10,805,872 B2 10/2020 Yi et al.
(Continued)

FOREIGN PATENT DOCUMENTS

KR 20110112789 10/2011
WO WO2009116824 9/2009

OTHER PUBLICATIONS

Ericsson, "On Remaining Issues of Search Spaces," R1-1805178, 3GPP TSG RAN WG1 Meeting #92bis, Sanya, China, Apr. 16-20, 2018, 12 pages.
(Continued)

*Primary Examiner* — John Pezzlo
(74) *Attorney, Agent, or Firm* — Fish & Richardson P.C.

(57) ABSTRACT

A method of monitoring a control signal in a wireless communication system, where the method is performed by a user equipment (UE) and includes: selecting at least one control resource set (CORESET) among a plurality of CORESETs based on an overlap between physical downlink control channel (PDCCH) monitoring occasions in the plurality of CORESETs; and monitoring a PDCCH only in the selected at least one CORESET, among the plurality of CORESETs. The method also includes: based on the at least one CORESET including a first CORESET, and based on a first reference signal of the first CORESET and a second reference signal of a second CORESET being associated with a same synchronization signal/physical broadcast channel block (SSB): monitoring the PDCCH in both the first CORESET and the second CORESET.

13 Claims, 22 Drawing Sheets

(51) Int. Cl.
*H04W 72/04* (2009.01)
*H04W 56/00* (2009.01)
*H04W 72/10* (2009.01)
*H04J 1/16* (2006.01)

(58) Field of Classification Search
USPC .................................... 370/252, 329, 436
See application file for complete search history.

(56) References Cited

U.S. PATENT DOCUMENTS

| | | | |
|---|---|---|---|
| 2018/0302889 A1* | 10/2018 | Guo | H04B 7/088 |
| 2019/0140776 A1* | 5/2019 | Seo | H04L 5/0048 |
| 2019/0150124 A1* | 5/2019 | Nogami | H04W 72/0446 |
| | | | 370/330 |
| 2019/0349964 A1* | 11/2019 | Liou | H04W 72/1284 |
| 2019/0357211 A1* | 11/2019 | Kim | H04W 74/006 |
| 2019/0393980 A1* | 12/2019 | Lin | A01K 63/065 |
| 2019/0394082 A1* | 12/2019 | Cirik | H04L 5/0048 |
| 2020/0045709 A1* | 2/2020 | Seo | H04W 56/001 |
| 2020/0053757 A1* | 2/2020 | Bagheri | H04L 5/0053 |

OTHER PUBLICATIONS

NTT DOCOMO, Inc., "Offline summary for AI 7.1.3.1.2 Search space," R1-1805538, 3GPP TSG RAN WG1 Meeting #92bis, Sanya, China, Apr. 16-20, 2018, 40 pages.

Samsung, "Draft CR to TS 38.213 capturing the RAN1#92bis meeting agreements," R1-1805776, 3GPP TSG-RAN1 Meeting #92bis, Sanya, China, Apr. 16-20, 2018, 80 pages.

LG Electronics, "Remaining issues on PDCCH structure," R1-1802206, 3GPP TSG RAN WG1 Meeting #92, Athens, Greece, Feb. 26-Mar. 2, 2018, 3 pages.

LG Electronics, "Remaining issues on PDCCH structure," R1-1806615, 3GPP TSG RAN WG1 Meeting #93, Busan, Korea, May 21-25, 2018, 4 pages.

LG Electronics, "Remaining issues on group common PDCCH," R1-1806617, 3GPP TSG RAN WG1 #93, Busan, Republic of Korea, May 21-25, 2018.

LG Electronics, "Remaining issues on search space," R1-1804551, 3GPP TSG RAN WG1 Meeting #92bis, Sanya, China, Apr. 16-20, 2018, 4 pages.

Extended European Search Report in European Application No. 19806079.0, dated May 15, 2020, 8 pages.

Ericsson, "Feature leads summary 3 for beam measurement and reporting," R1-1807782, 3GPP TSG-RAN WG1 Meeting #93, Busan, May 21-25, 2018, 41 pages.

Qualcomm, "Summary of Beam Mgmt.," R1-1721640, 3GPP TSG RAN WG1 Meeting #91, Reno, USA, Nov. 27-Dec. 1, 2017, 19 pages.

Korean Office Action in Korean Appln. No. 10-2020-0082329, dated Jul. 21, 2020, 9 pages (with English translation).

United States Office Action in U.S. Appl. No. 16/922,435, dated Oct. 21, 2020, 12 pages.

\* cited by examiner

METHOD FOR MONITORING CONTROL SIGNAL OF TERMINAL IN WIRELESS COMMUNICATION SYSTEM AND TERMINAL USING THE SAME

CROSS-REFERENCE TO RELATED APPLICATIONS

Pursuant to 35 U.S.C. § 119 (e), this application claims the benefit of an earlier filing date and right of priority to Korean Application No. 10-2018-0089551, filed on Jul. 31, 2018, the contents of which are all hereby incorporated by reference herein in their entirety.

TECHNICAL FIELD

The present disclosure relates to wireless communication and, more particularly, to monitoring control signals of a terminal in a wireless communication system.

BACKGROUND

As communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability and/or latency-sensitive service is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience. NR is also referred to as fifth generation (5G) technology.

SUMMARY

Implementations are disclosed herein that enable monitoring control signals of a terminal in a wireless communication system.

One general aspect of the present disclosure includes a method of monitoring a control signal in a wireless communication system, the method performed by a user equipment (UE) and including: selecting at least one control resource set (CORESET) among a plurality of CORESETs based on an overlap between physical downlink control channel (PDCCH) monitoring occasions in the plurality of CORESETs. The method also includes monitoring a PDCCH only in the selected at least one CORESET, among the plurality of CORESETs, where based on the at least one CORESET including a first CORESET, and based on a first reference signal of the first CORESET and a second reference signal of a second CORESET being associated with a same synchronization signal/physical broadcast channel block (SSB): monitoring the PDCCH in both the first CORESET and the second CORESET. Other embodiments of this aspect include corresponding computer systems, apparatus, and computer programs recorded on one or more computer storage devices, each configured to perform the actions of the methods.

Implementations may include one or more of the following features. The method where, in selecting the at least one CORESET, a first priority of a CORESET that includes a common search space (CSS) is higher than a second priority of a CORESET that includes a UE-specific search space (USS). The method where selecting the at least one CORESET includes: based on the plurality of CORESETs including multiple CORESETs that include a CSS: selecting the at least one CORESET to include a CORESET, among the multiple CORESETs that include the CSS, with a smallest index. The method where selecting the at least one CORESET includes: selecting, among the plurality of CORESETs, a CORESET that corresponds to a CSS having a lowest index, from a cell that has a smallest cell index and that contains the CSS. The method where the first CORESET and the second CORESET are assumed by the UE to have same quasi co location (QCL) properties. The method where the QCL properties are related to a spatial receive (RX) parameter. Implementations of the described techniques may include hardware, a method or process, or computer software on a computer-accessible medium.

Another general aspect of the present disclosure includes a user equipment (UE), the UE including: a transceiver. The user equipment also includes at least one processor; and at least one computer memory operably connectable to the at least one processor and storing instructions that, when executed by the at least one processor, perform operations including: selecting at least one control resource set (CORESET) among a plurality of CORESETs based on an overlap between physical downlink control channel (PDCCH) monitoring occasions in the plurality of CORESETs. The operations also include monitoring a PDCCH only in the selected at least one CORESET, among the plurality of CORESETs, where based on the at least one CORESET including a first CORESET, and based on a first reference signal of the first CORESET and a second reference signal of a second CORESET being associated with a same synchronization signal/physical broadcast channel block (SSB): monitoring the PDCCH in both the first CORESET and the second CORESET. Other embodiments of this aspect include corresponding computer systems, apparatus, and computer programs recorded on one or more computer storage devices, each configured to perform the actions of the methods.

Implementations may include one or more of the following features. The UE where, in selecting the at least one CORESET, a first priority of a CORESET that includes a common search space (CSS) is higher than a second priority of a CORESET that includes a UE-specific search space (USS). The UE where selecting the at least one CORESET includes: based on the plurality of CORESETs including multiple CORESETs that include a CSS: selecting the at least one CORESET to include a CORESET, among the multiple CORESETs that include the CSS, with a smallest index. The UE where selecting the at least one CORESET includes: selecting, among the plurality of CORESETs, a CORESET that corresponds to a CSS having a lowest index, from a cell that has a smallest cell index and that contains the CSS. The UE where the first CORESET and the second CORESET are assumed by the UE to have same quasi co location (QCL) properties. The UE where the QCL properties are related to a spatial receive (RX) parameter. Implementations of the described techniques may include hardware, a method or process, or computer software on a computer-accessible medium.

Another general aspect of the present disclosure includes at least one processor that is configured to control a wireless communication device to perform operations including: selecting at least one control resource set (CORESET) among a plurality of CORESETs based on an overlap between physical downlink control channel (PDCCH) monitoring occasions in the plurality of CORESETs. The operations also include monitoring a PDCCH only in the selected at least one CORESET, among the plurality of CORESETs, where based on the at least one CORESET including a first CORESET, and based on a first reference signal of the first CORESET and a second reference signal of a second CORESET being associated with a same synchronization signal/physical broadcast channel block (SSB): monitoring the PDCCH in both the first CORESET and the second CORESET.

Other embodiments of this aspect include corresponding computer systems, apparatus, and computer programs recorded on one or more computer storage devices, each configured to perform the actions of the methods.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

In some wireless communication systems, such as those compatible with Long Term Evolution (LTE) technology, a terminal monitors its control channels over the entire system bandwidth. On the other hand, in systems that are compatible with NR technology, a control channel of a user equipment (UE) may be monitored in a particular time/frequency resource referred to as a control resource set (CORESET) which is only a part of the system band. In such scenarios, a time point/occasion for monitoring the control channel may be given. However, depending on situations, the monitoring occasions of the control channel may overlap among a plurality of CORESETs. In this case, problems may arise in how a terminal is to monitor the control channel.

Implementations of the present disclosure enable techniques for monitoring of control signals of a terminal in a wireless communication system.

According to some implementations of the present disclosure, if monitoring times/occasions of a control channel overlap with each other among a plurality of CORESETs, then the control channel is monitored only in a specific CORESET which is selected according to priority. In scenarios where a terminal does not monitor all of a plurality of overlapping CORESETs at a control channel monitoring time (occasion), the terminal may operate without problems, even in a communication environment beyond capability of the terminal (e.g., in a system where a number of allocated CORESETs is greater than the number of CORESETs that the terminal can monitor simultaneously). Also, in NR, beams may be used for transmission and reception. The parameters utilized for receiving the beams may be referred to as spatial reception parameters. If the monitoring times/occasions of a control channel are overlapped among a plurality of CORESETs, then control channel monitoring efficiency may be increased by ensuring that all CORESETs which exhibit the same spatial reception parameter properties perform control channel monitoring.

Figure 1:
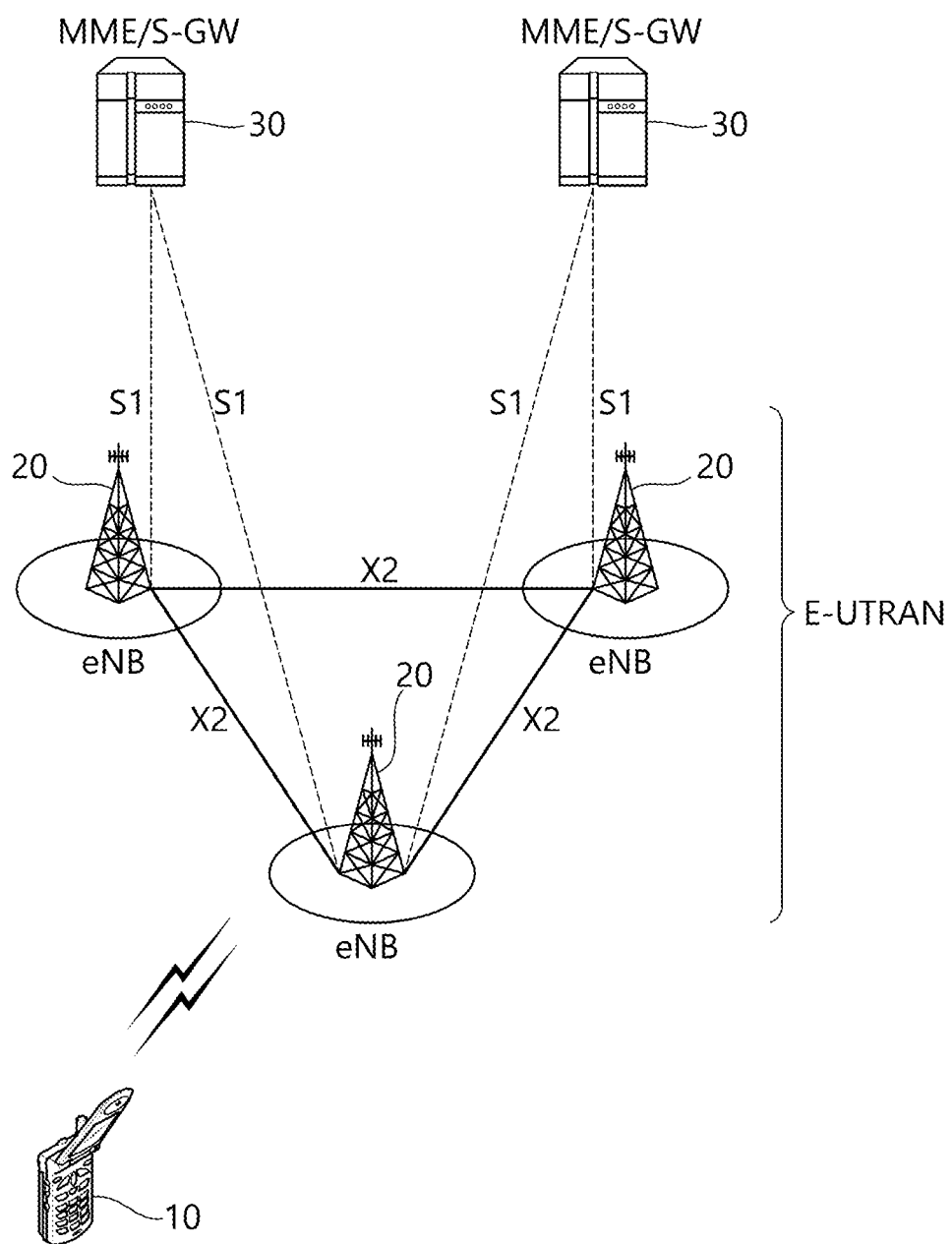
FIG. 1 shows an example of wireless communication system to which the present disclosure may be applied.

FIG. 1 shows an example of a wireless communication system to which the present disclosure may be applied. The wireless communication system may be referred to as an Evolved-UMTS Terrestrial Radio Access Network (E-UTRAN) or a Long Term Evolution (LTE)/LTE-A system.

In this example, the E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
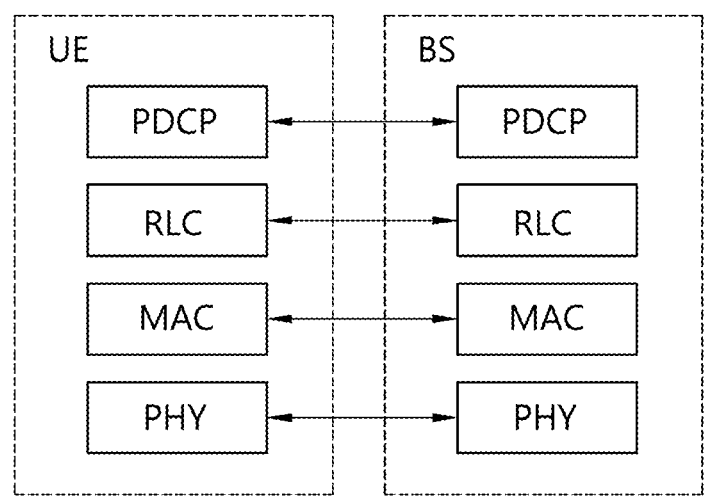
FIG. 2 is a diagram showing an example of a wireless protocol architecture for a user plane.
Figure 3:
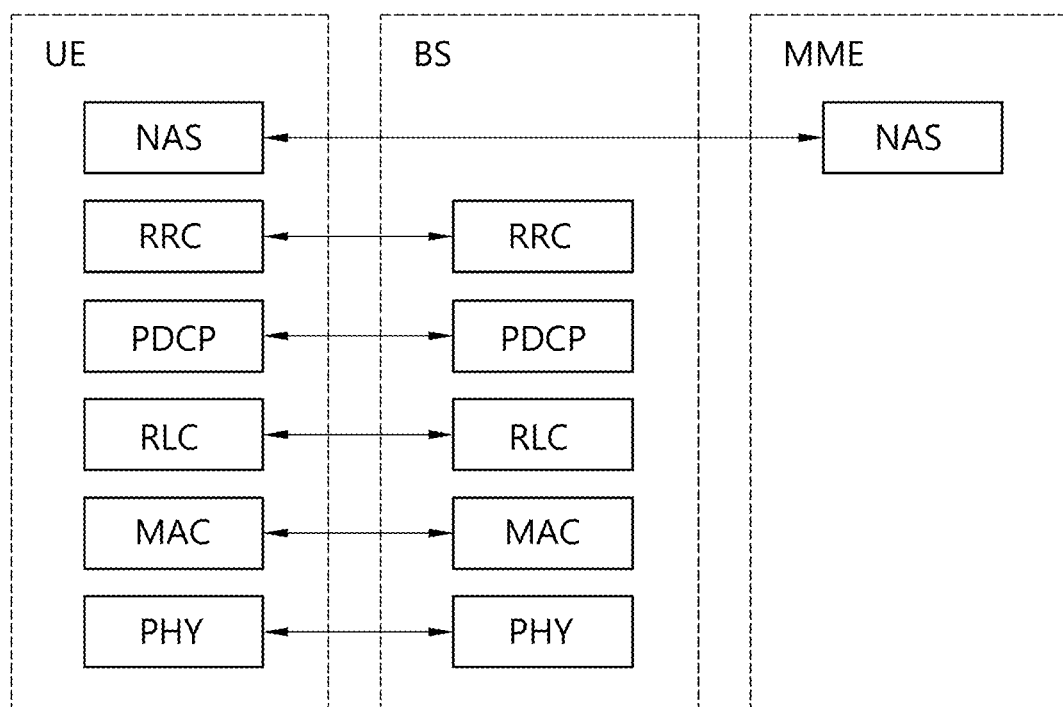
FIG. 3 is a diagram showing an example of a wireless protocol architecture for a control plane.

FIG. 2 is a diagram showing an example of a wireless protocol architecture for a user plane. FIG. 3 is a diagram showing an example of a wireless protocol architecture for a control plane. The user plane is a protocol stack for user data transmission. The control plane is a protocol stack for control signal transmission.

Referring to FIGS. 2 and 3, a PHY layer provides an upper layer (higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers (e.g., between the PHY layers of a transmitter and a receiver) through a physical channel. The physical channel may be modulated according to an Orthogonal Frequency Division Multiplexing (OFDM) scheme, and use both time resources and frequency resources as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating technique. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
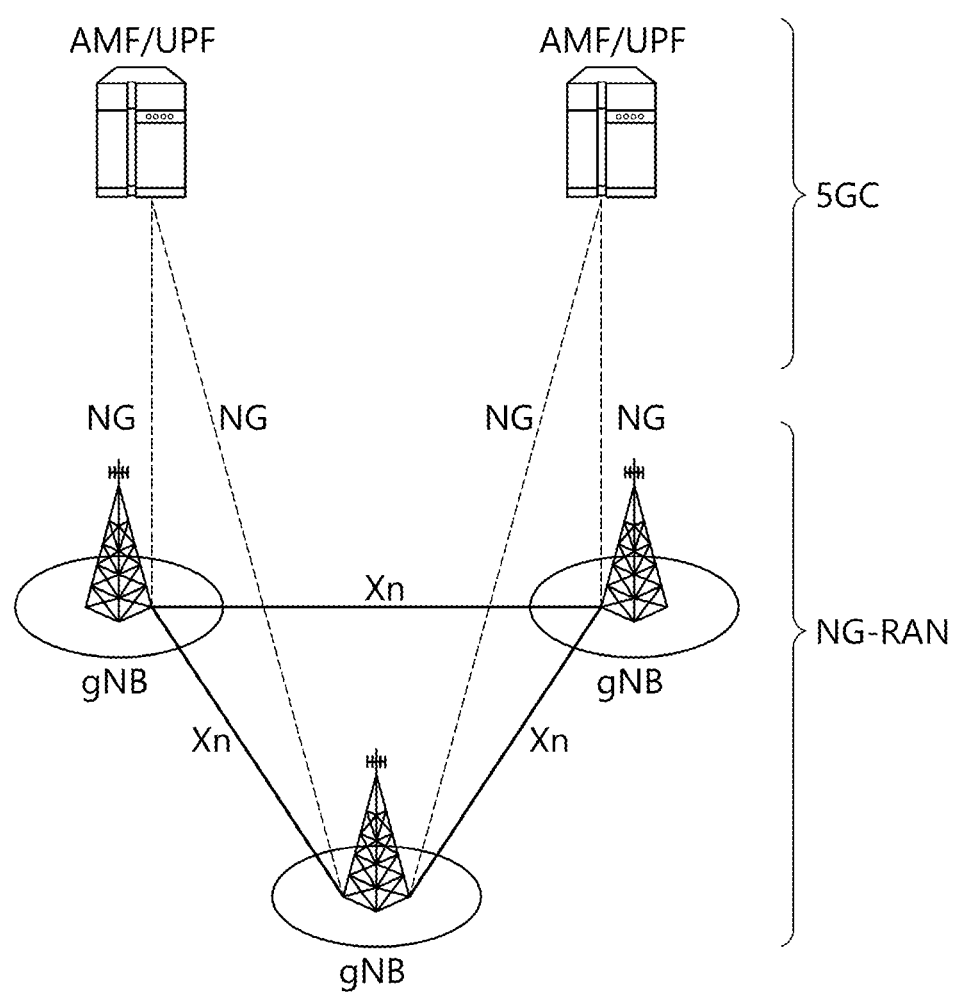
FIG. 4 illustrates an example of a system structure of a next generation radio access network (NG-RAN) to which NR is applied.

FIG. 4 illustrates an example of a system structure of a next generation radio access network (NG-RAN) to which NR is applied.

Referring to FIG. 4, the NG-RAN may include a gNodeB (gNB) and/or an eNodeB (eNB) that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
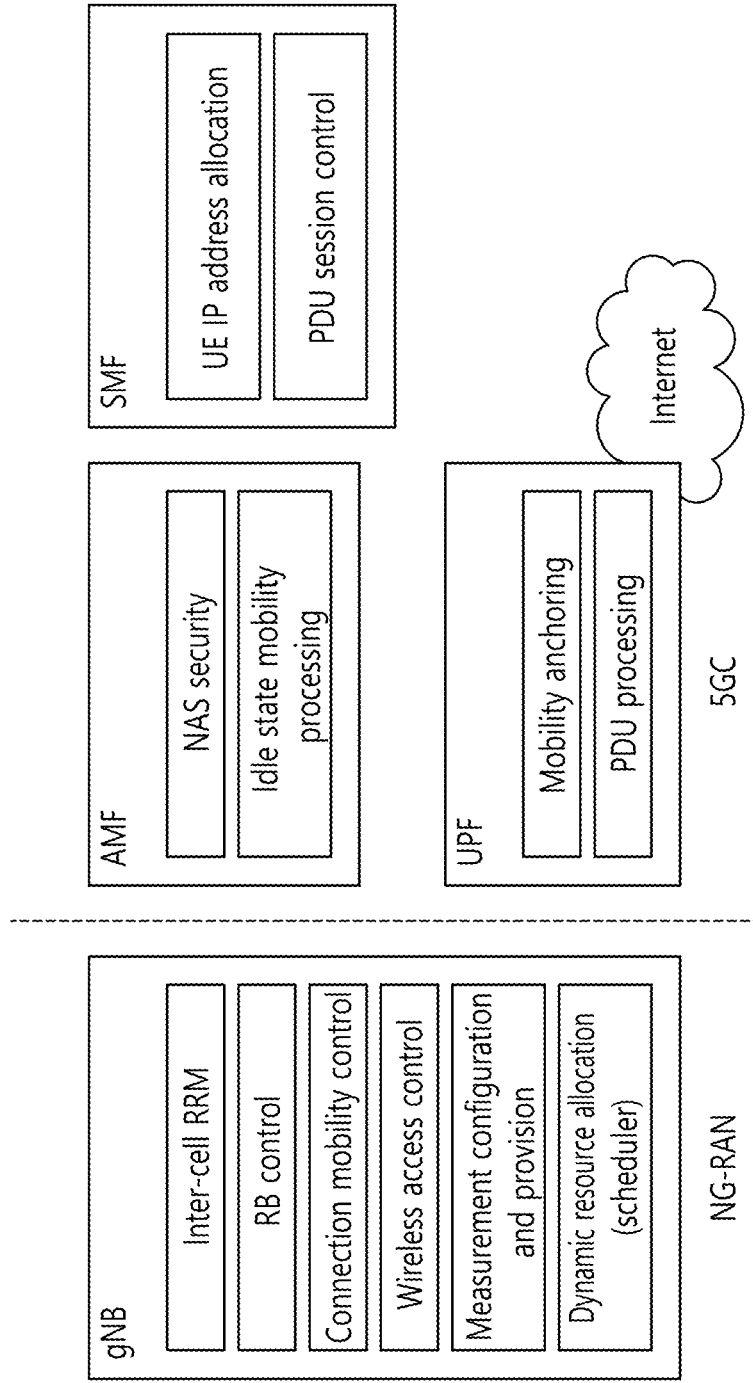
FIG. 5 illustrates an example of a functional division between an NG-RAN and a 5G core (5GC)

FIG. 5 illustrates an example of a functional division between an NG-RAN and a 5G code (5GC).

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
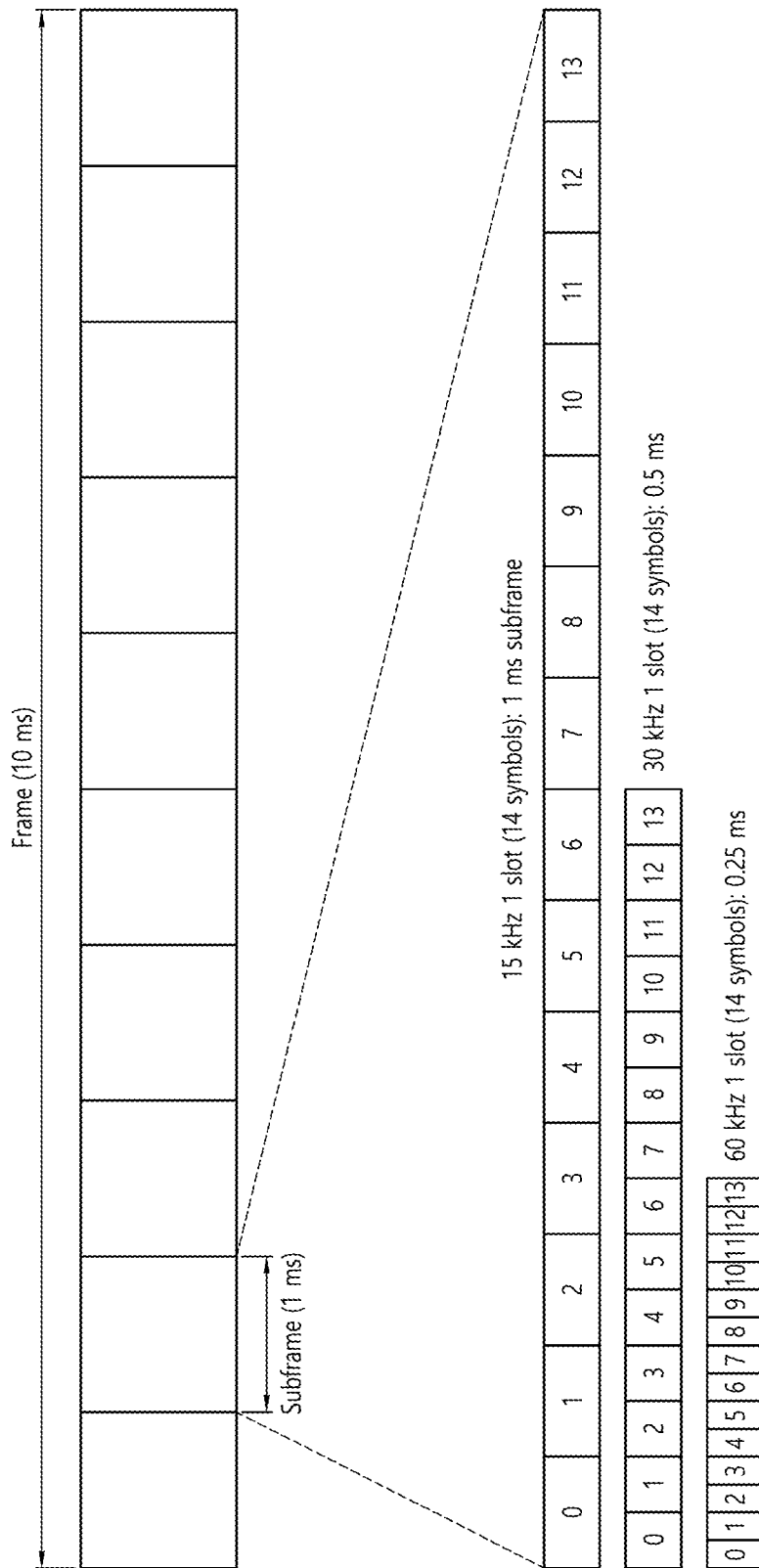
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following Table 1 illustrates an example of a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following Table 2 illustrates an example of the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In the example of FIG. 6, subcarrier spacing configurations of μ=0, 1, 2 is illustrated.

A physical downlink control channel (PDCCH) may include one or more control channel elements (CCEs) as illustrated in the example of Table 3, below.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in some wireless communication systems, a resource unit called a control resource set (CORESET) may be implemented. A terminal may receive the PDCCH in the CORESET.

Figure 7:
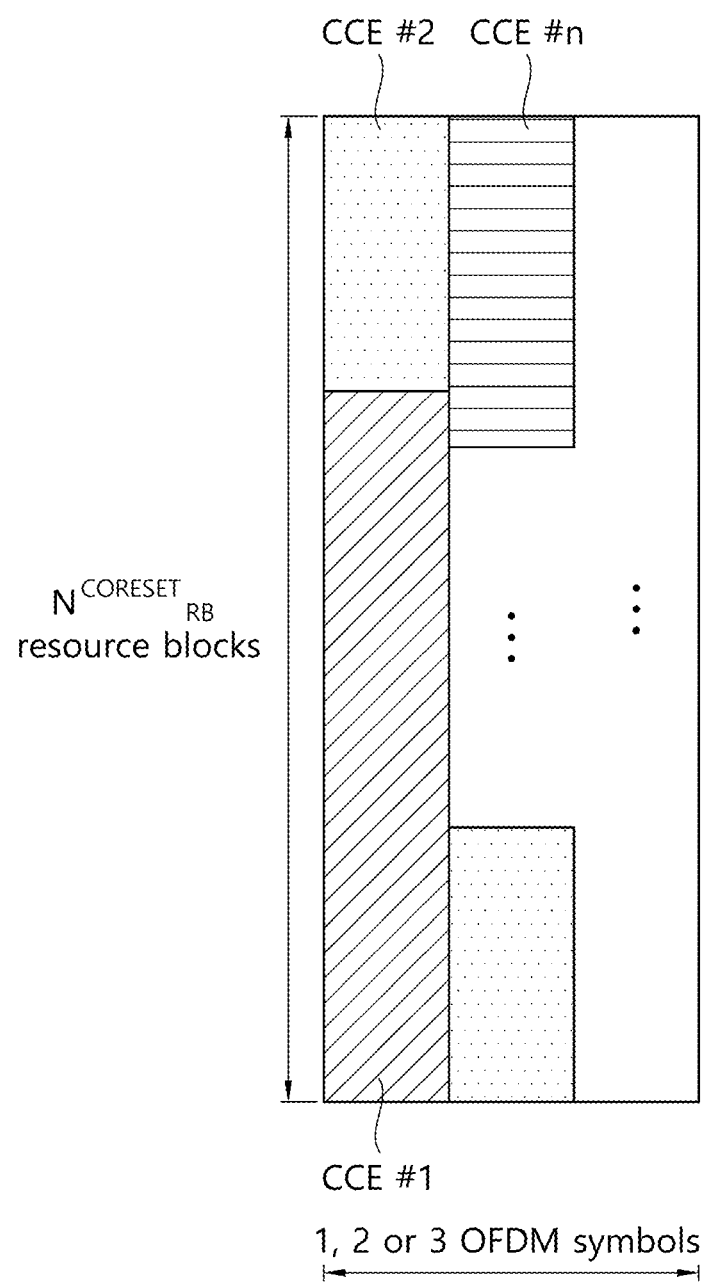
FIG. 7 illustrates an example of a control resource set (CORESET)

FIG. 7 illustrates an example of a CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. The parameters $N^{CORESET}_{RB}$ and $N^{CORESET}_{symb}$ may be provided by a base station, for example via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

In some implementations, a plurality of CORESETs may be configured for the terminal.

Figure 8:
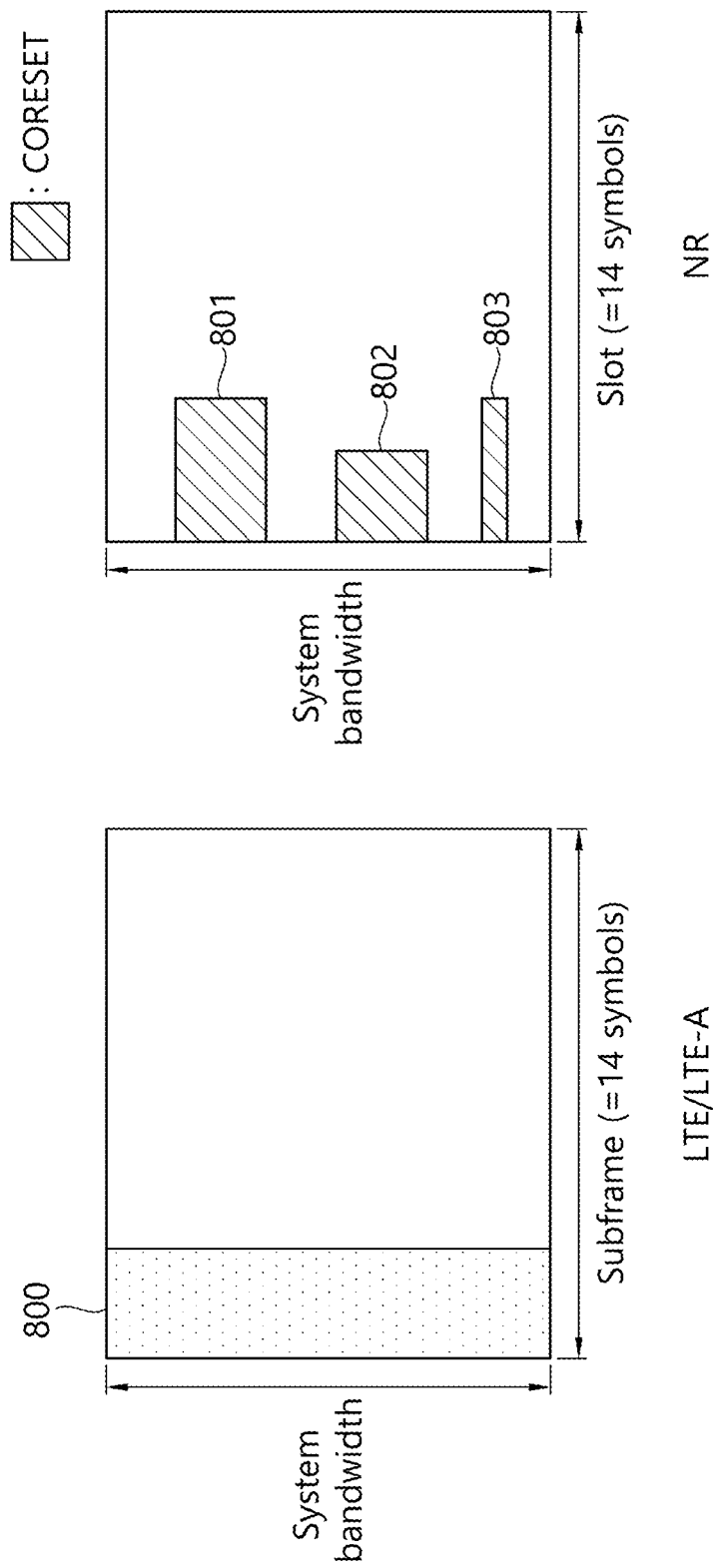
FIG. 8 is a diagram illustrating an example of a difference between a related art control region and the CORESET in NR.

FIG. 8 is a diagram illustrating an example of a difference between a related art control region and the CORESET in NR.

Referring to FIG. 8, a control region 800 in the related art wireless communication system (e.g., a system that is compatible with LTE/LTE-A technology) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in systems that are compatible with NR technology, a CORESET described above is implemented. In the example of FIG. 8, CORESETs 801, 802, and 803 are radio resources for control information to be received by the terminal. Each of the CORESETs 801, 802, and 803 may use only a portion, rather than the entirety, of the system bandwidth. The BS may allocate a CORESET to each UE, and the BS may transmit control information through the allocated CORESET to the UE. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

In some scenarios, a system that is compatible with NR may require high reliability. In such situations, a target block error rate (BLER) for downlink control information (DCI) transmitted through a downlink control channel (e.g., physical downlink control channel (PDCCH)) may remarkably decrease compared to a BLER of other technologies. As an example of a technique for achieving high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
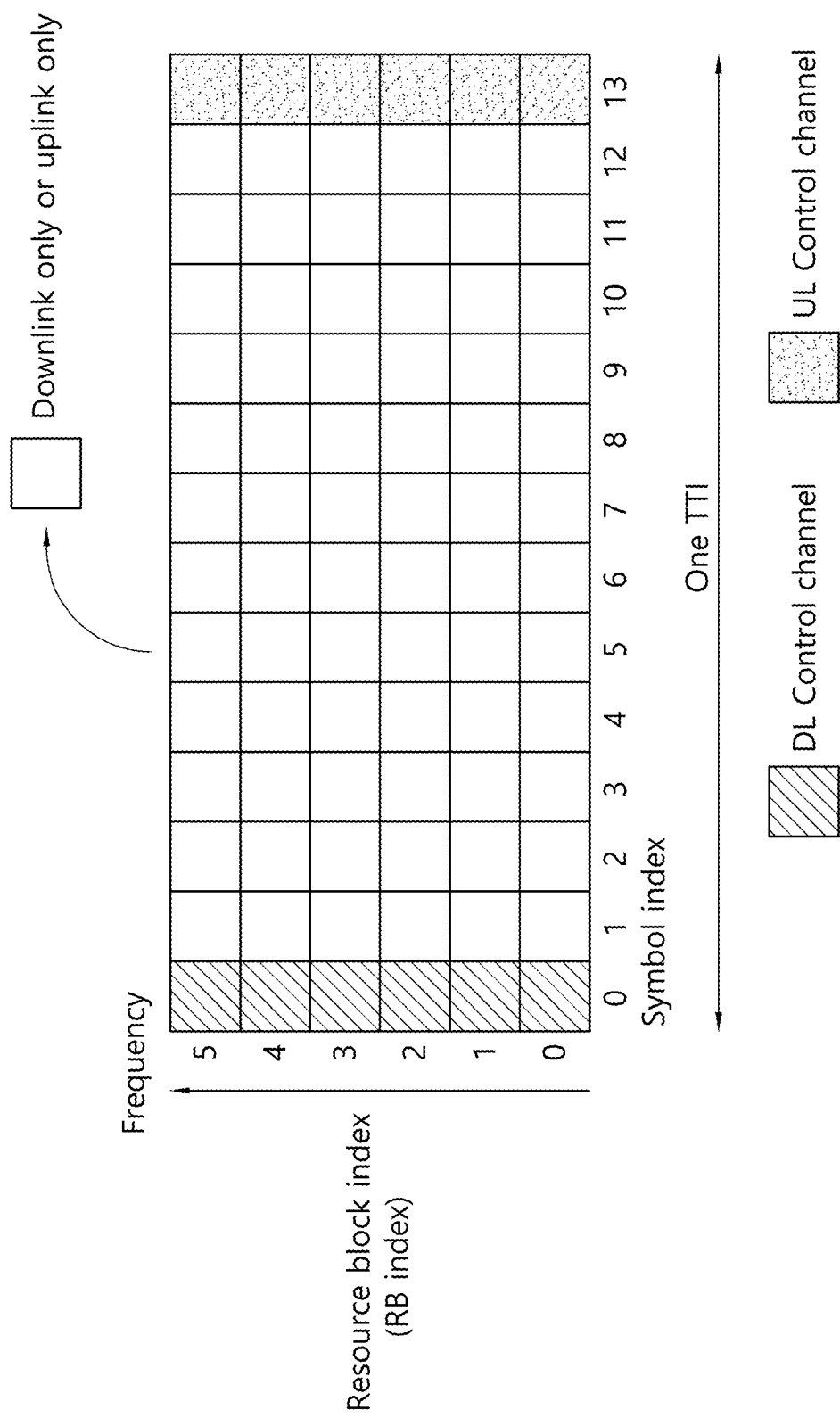
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, the hash-marked region represents a downlink control region, and a shaded region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this subframe structure in which both data and control are time-division multiplexed (TDMed), a time gap may be implemented to allow for a base station and a terminal to switch from a transmission mode to a reception mode or from the reception mode to the transmission mode. To this end, some OFDM symbols in the self-contained subframe structure may be set to a guard period (GP) at a time when DL switches to UL.

<Analog Beamforming #1>

In some scenarios of the present disclosure, wavelengths are shortened to millimeter wave (mmW) lengths, enabling in a large number of antenna elements to be installed in an area. For example, a wavelength of 1 cm at 30 GHz may be implemented, resulting in a total of 100 antenna elements that can be installed in the form of a 2-dimensional array at an interval of 0.5 lambda (wavelength) in a panel of 5×5 cm. Accordingly, in the mmW wavelength regime, it is possible to increase a beamforming (BF) gain using a large number of antenna elements to increase coverage or to improve throughput.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a technique of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a technique of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
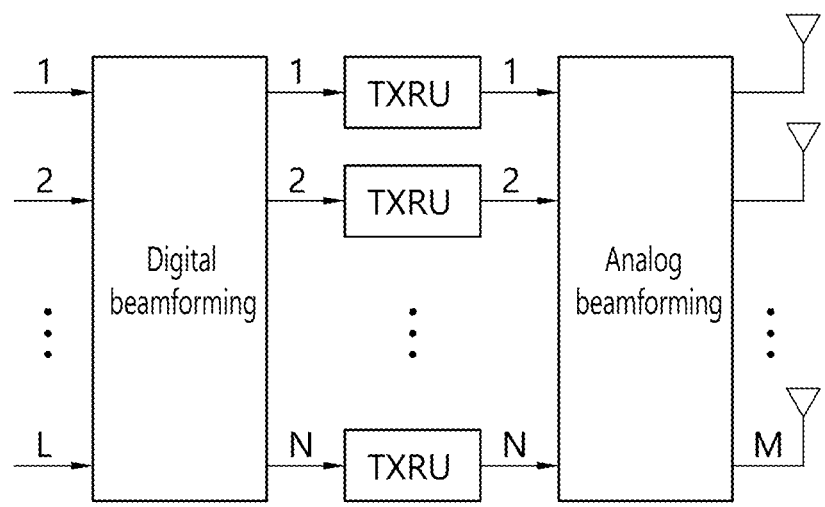
FIG. 10 is a diagram illustrating an example of hybrid beamforming from the viewpoint of transceiver units (TXRUs) and physical antennas.

FIG. 10 is a diagram illustrating an example of hybrid beamforming from the viewpoint of TXRUs and physical antennas.

In FIG. 10, the number of digital beams is L and the number of analog beams is N. Further, in NR systems, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
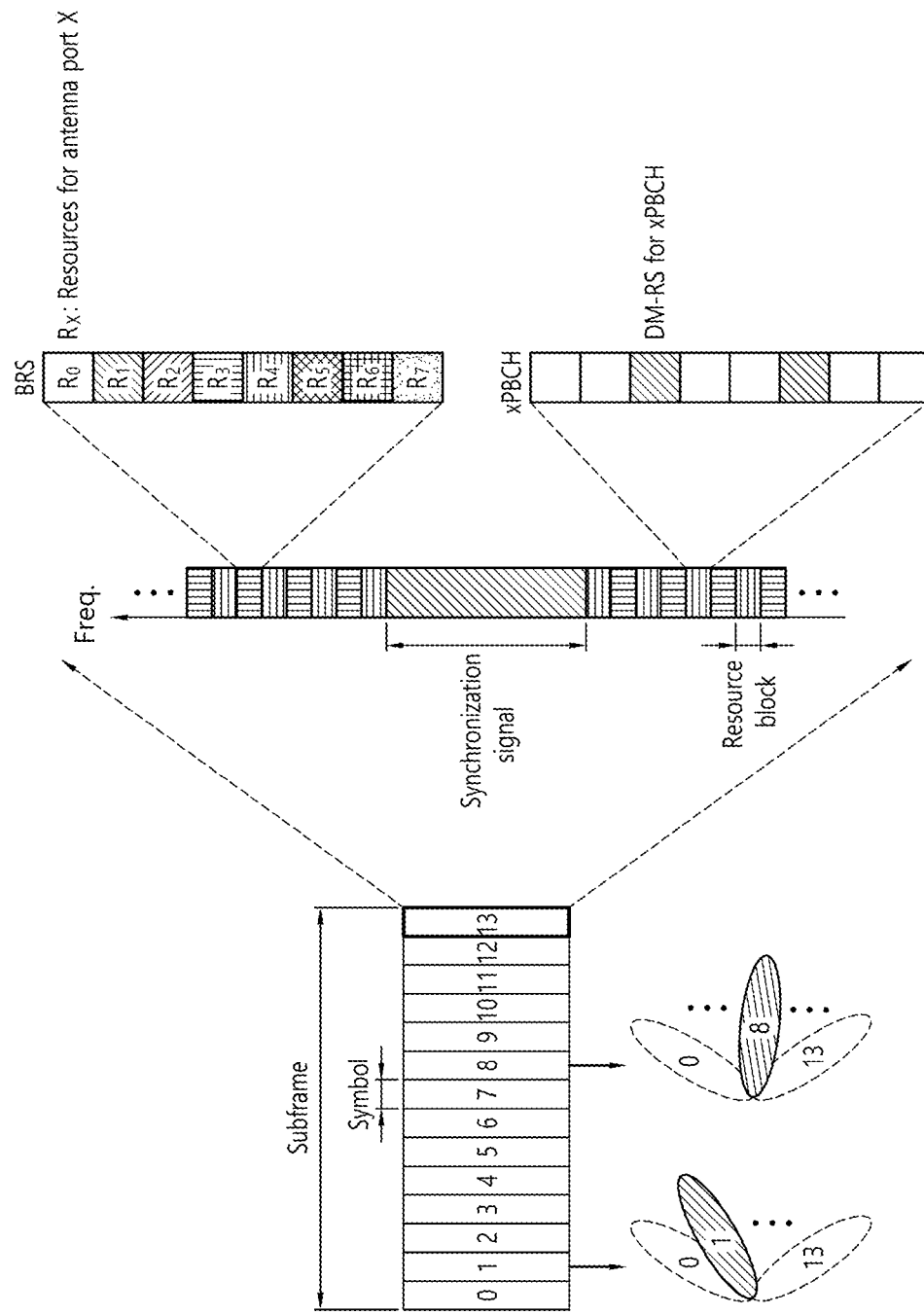
FIG. 11 illustrates an example of the beam sweeping operation for a synchronization signal and system information in a downlink (DL) transmission procedure.

FIG. 11 illustrates an example of the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a technique of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

In NR, a synchronization signal block (SSB), which includes a synchronization signal (SS) and a physical broadcast channel (PBCH), may be composed of four OFDM symbols in the time domain, numbered in the ascending order from 0 to 3 within the SSB; and a primary synchronization signal (PSS), secondary synchronization signal (SSS), and PBCH associated with demodulation reference signal (DMRS) may be mapped to the symbols. Here, a synchronization signal block may be termed as an SS/PBCH block (or SSB for short).

In NR, a plurality of synchronization signal blocks (SSBs) may be transmitted at different times, respectively, and the SSB may be used for performing initial access (IA), serving cell measurement, and the like. As such, it may be preferable to transmit the SSB first when transmission time and resources of the SSB overlap with those of other signals. To this end, the network may broadcast the transmission time and resource information of the SSB or indicate them through UE-specific RRC signaling.

Further details of various implementations of the present disclosure are described below. In what follows, an upper layer signal may refer to a Radio Resource Control (RRC) message, MAC message, or system information.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

The present disclosure describes a technique for configuring a CORESET and search space set required for performing the BFR process from the viewpoint of control channel processing and a candidate mapping technique for handling blind decoding (BD) and/or channel estimation (CE) complexity. The Transmission Configuration Indication (hereinafter, TCI) state in the present disclosure may be configured for each CORESET of a control channel and may be used as a parameter for determining a reception (Rx) beam.

In some implementations, for each DL BWP of a serving cell, a UE may be configured for three or fewer CORESETs. Also, in some implementations, a UE may receive the following information for each CORESET:

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location representing quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

Here, 'TCI-State' parameter/information element is associated with a QCL type (there may be QCL type A, B, C, and D; and for description of each type, refer to the example of Table 4, below) corresponding to one or two downlink reference signals.

TABLE 4

| QCL Type | Description |
|---|---|
| QCL-TypeA | Doppler shift, Doppler spread, average delay, delay spread |
| QCL-TypeB | Doppler shift, Doppler spread |
| QCL-TypeC | Doppler shift, average delay |
| QCL-TypeD | Spatial Rx parameter |

Each 'TCI-State' may include a parameter for configuring the quasi co-location relationship between one or two downlink reference signals and DM-RS port of the PDSCH/PDCCH.

The following Table 5 is an example of 'TCI-State' information element (IE).

TABLE 5

```
-- ASN1START
-- TAG-TCI-STATE-START
TCI-State ::=              SEQUENCE {
    tci-StateId                TCI-StateId,
    qcl-Type1                  QCL-Info,
    qcl-Type2                  QCL-Info          OPTIONAL,  -- Need R
    ...
}
QCL-Info ::=               SEQUENCE {
    cell                       ServCellIndex     OPTIONAL,  -- Need R
    bwp-Id                     BWP-Id            OPTIONAL, -- Cond CSI-RS-Indicated
    referenceSignal            CHOICE {
        csi-rs                     NZP-CSI-RS-ResourceId,
        SSB                        SSB-Index
    },
    qcl-Type                   ENUMERATED {typeA, typeB, typeC, typeD},
    ...
}
-- TAG-TCI-STATE-STOP
-- ASN1STOP
```

Among the 'TCI-State' information elements, 'bwp-Id' informs of a DL BWP which a Reference Signal (RS) is located in. 'cell' informs of The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. 'referenceSignal' informs of Reference signal with which quasi-collocation information is provided. 'gel-Type' may indicate at least one of QCL-Types of Table 4.

In some implementations, for a CORESET with index 0, the UE assumes that a DM-RS antenna port for PDCCH receptions in the CORESET is quasi co-located with i) the one or more DL RS configured by a TCI state, where the TCI state is indicated by a MAC CE activation command for the CORESET or ii) a SS/PBCH block the UE identified during a most recent random access procedure not initiated by a PDCCH order that triggers a non-contention based random access procedure, if no MAC CE activation command indicating a TCI state for the CORESET is received after the most recent random access procedure.

For a CORESET other than a CORESET with index 0, if a UE is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that QCL-TypeD of a CSI-RS in a TCI state indicated by a MAC CE activation command for the CORESET is provided by a SS/PBCH block.

If the UE receives the MAC CE activation command for one of the TCI states, the UE may apply the activation command after 3 msec of a slot that transmits HARQ-ACK information about the PDSCH providing the activation command. An active BWP may be defined as an active BWP in a slot when the activation command is applied.

In one serving cell, the UE may receive 10 or fewer search space sets from each DL BWP configured for the UE. For each search space set, the UE may receive at least one of the following information:

1) Search space set index s (0≤s<40),
2) association between a CORESET P and the search space set s,
3) PDCCH monitoring periodicity and PDCCH monitoring offset (slot unit),
4) PDCCH monitoring pattern within a slot (for example, the pattern indicates the first symbol of the CORESET within a slot for PDCCH monitoring),
5) the number of slots in which the search space set s exists,
6) the number of PDCCH candidates for each CCE aggregation level,
7) information indicating whether the search space set s is a CSS or an USS, or
8) DCI format that the UE has to monitor.

Next, further details are presented with regards to CORESETS for beam failure recovery (BFR) and search space sets.

[CORESET for Beam Failure Recovery (BFR) and Search Space Set]

During the BFR process, when a UE performs a Random Access Channel (RACH) process by using a resource associated with a particular selected beam (e.g., a beam chosen as the best one), a CORESET and a search space may be used for receiving a signal from the network, such as a Random Access Response (RAR) message. Until a new CORESET and search space reflecting additionally changed beam information are configured, the UE may receive a UL grant or DL assignment through the BFR CORESET.

<Relationship Between BWP and 'BFR CORESET and Search Space Set'>

In some implementations of NR systems, a maximum of 3 CORESETs and 10 search space sets may be configured for each Bandwidth Part (BWP). In such scenarios, scheduling flexibility may be increased by making each CORESET have different CORESET properties (for example, CCE-to-REG mapping (with or without interleaving), REG bundle size (for example, 2, 3, 6 REGs), and wideband (WB)/narrow band (NB) reference signal) and making each search space set have a different monitoring occasion (in what follows, also referred to as monitoring times), different aggregation level (AL), and/or different number of candidates. A UE monitors a set of PDCCH candidates in one or more CORESETs on an activated DL BWP of each activated serving cell for which PDCCH monitoring is configured according to the corresponding search space sets. Here, monitoring includes decoding each of the PDCCH candidates according to the DCI format.

In the case of a BFR CORESET, (irrespective of scheduling flexibility of the aforementioned PDCCH transmission and reception) since it may be necessary for a process of searching for a new beam because of degradation of beam reception performance, it may be preferable not to apply the restriction corresponding to the maximum number of CORESETs per BWP (namely the restriction that allows 3 CORESETs for each BWP) to the BFR CORESET. In other words, the UE may be configured with 3 CORESETs excluding the BFR CORESET for each BWP and 10 search space sets excluding the BFR search space set. When a normal CORESET is reused for the BFR CORESET, if the normal CORESET is configured for a use rather than the BFR, the BFR CORESET may be included in the maximum number of CORESETs for each BWP. This scheme may be applied the same for the search space set.

The BFR CORESET may be configured for each BWP or may be configured by the initial BWP. When the BFR CORESET is configured for each BWP, the corresponding configuration for each BWP may be applied, otherwise the BFR CORESET of the initial BWP may be monitored.

In addition, besides the following techniques, a previously configured CORESET and/or CORESET that associates a search space set with the BFR and/or search space set may be reused. In this case, part of parameters of the CORESET configuration and/or search space set configuration may be newly configured. For example, for the case of a parameter such as the TCI state in the CORESET configuration, irrespective of a previous configuration, it may be assumed that in the BFR CORESET, the best beam is defined from the measurement of a UE or by the RACH process performed by the UE in the BFR process.

<Case where the BFR CORESET is Configured for Each BWP>

1) A BFR CORESET may always be configured for a BWP (namely, an active BWP) for which a UE maintains transmission and reception to and from the current network. This may be implemented through such a technique that includes information about the BFR CORESET within the BFR configuration. Also, a monitoring occasion of the BFR CORESET may be determined by a PRACH transmission time due to BFR. For example, the monitoring occasion of the BFR CORESET may be given by each slot within a Random Access Response (RAR) monitoring window after the PRACH transmission slot index plus 4.

2) It may be preferable to consider/recognize that a connection to a serving cell is maintained even if the BFR process is under progress. Therefore, a UE may perform not only monitoring of the BFR CORESET but also monitoring of DCI according to a previously configured CORESET and search space set configuration. For example, in the BFR CORESET, it may be defined in a way to monitor only the PDCCH scrambled with C-RNTI. In this case, since there are times that the information allocated with a unique RNTI such as slot format indicator or slot format index (SFI), system information (SI), or paging is not transmitted to the UE, it may be preferable to maintain monitoring of an existing CORESET. At this time, a technique for configuring actual candidates by which a UE performs monitoring will be described later.

<Case where the BFR CORESET is Configured for the Initial BWP>

1) The initial BWP may be basically configured with a CORESET configured by the PBCH (CORESET #0) and CORESET configured for the RACH process (CORESET #1); and if the CORESET #1 is not configured, the CORESET #0 may be reused for the CORESET #1.

2) When conventional DCI monitoring is performed, the UE may have to perform monitoring of different BWPs in the same slot to monitor the previous DCI. In this case, the following techniques (options) may be considered.

Option 1) Monitoring of a BFR CORESET is considered to be a special case, and even when an active BWP does not coincide with the initial BWP, DCI monitoring for the BFR and monitoring of a previously configured DCI may all be performed.

Option 2) When a BWP performing DCI monitoring of BFR is different from a previous active BWP, DCI monitoring of the previous active BWP may not be performed. Only when the BWP performing DCI monitoring of BFR is the same as a previous active BWP, a technique for performing monitoring of a previous DCI may be included.

3) When a BFR CORESET is configured for the initial BWP, the BFR CORESET may be indicated by using the following technique (option).

Option 1) Reuse of CORESET #0 or CORESET #1

A BFR CORESET may be predefined or the network may configure a BFR CORESET to reuse a previously defined CORESET through higher layer signaling.

If the CORESET #0 is reused as a BFR CORESET, and BFR process is performed based on the CSI-RS port, the network may signal the relationship between each CSI-RS port used in the BFR process and the SSB index associated with the CORESET #0. For example, a mapping relationship between the CSI-RS port used in the BFR process and the SSB index may be indicated through higher layer signaling.

Option 2) New CORESET for BFR

The network may indicate/provide a configuration for a BFR CORESET defined within the initial BWP to each UE, and an indication/provision technique may use a broadcast signal or UE-dedicated signal.

In the case of a BFR CORESET/SS, configuration may be optional. Therefore, if the BFR CORESET/SS is not configured within the corresponding active BWP, or a BFR Contention Free Random Access (CFRA) resource is not configured, a UE may perform the following operation.

1) Beam recovery may be performed along a Contention Based Random Access (CBRA) resource. An RAR CORESET/SS associated with the corresponding CBRA resource may be assumed to be a BFR CORESET, in which a response reception for a plurality of beams may be expected.

2) A response reception for a plurality of beams may be expected through an RAR CORESET/SS associated with the CBRA resource.

3) A CFRA/CBRA/RAR CORESET/SS resource may be used by returning to the initial DL/UL BWP. Or, this option may be applied only to the case where a BFR CORESET/SS or CFRA resource does not exist within the corresponding active DL/UL BWP.

[Blind Decoding and Channel Estimation Complexity on BFR Process]

In NR, monitoring of a plurality of CORESETs and search space sets may be configured for the same slot. Therefore, the maximum number of blind decoding (BD) and channel estimation that may be performed within one slot may be defined by considering complexity of a UE, and those slots that exceed the corresponding maximum value may not perform monitoring for part of the search space set/monitoring candidates. To perform monitoring of a BFR CORESET smoothly, a slot that performs monitoring of the BFR CORESET may configure a candidate that needs to be monitored as follows (currently, for normal slots, BD and channel estimation for a common search space (CSS) are performed first, and it is assumed that the limit due to the CSS is not exceeded. Afterwards, candidate selection (or mapping) at the search space set level is performed for a UE-specific search space (USS), and it is assumed that a lower search space index corresponds to higher priority for a plurality of USSs).

<Priority of BFR Search Space Set>

1) Monitoring of a BFR search space set may be designated as the highest priority. i) Since serving beam configuration has to be performed first in the BFR process, monitoring of candidates belonging to a search space set related to BFR has to be performed. ii) Therefore, a search space set related to BFR (for example, a response with respect to the PRACH transmitted by a UE during the BFR process and a subsequent process) may configure the highest priority irrespective of the type (for example, CSS/USS) of the corresponding BFR search space set, and it may be assumed that no candidate belonging to the corresponding search space set exceeds the limit.

2) Monitoring of a BFR search space set may be performed separately from BD per slot and CCE limit. For BFR-related DCI, decoding may not necessarily have to be completed within a slot that receives the DCI. Therefore, previously configured DCI monitoring may be performed continuously by considering BD per slot and CCE limit, and monitoring of an SFR search space set may be performed independently. At this time, it may be assumed that the BD and the number of CCEs configured by the BFR search space set do not exceed the limit.

<Assumption on CSSs>

As described above, for normal slots (in other words, slots that do not perform the BFR process), it may be assumed that configured common search spaces do not exceed the maximum number of BDs and CCEs.

However, since the number of BD/CCEs for BFR monitoring is added when a BFR CORESET is monitored, there may be chances that the BD/CCE limit may be exceeded when the BD/CCEs due to existing common search spaces are taken into account. Therefore, the following assumption may be applied for a slot that monitors a BFR search space set. The following options may be implemented separately or in the form of a combination thereof. The following options may be applied only to a common search space, but an USS according to a previous configuration may not be monitored during the BFR process. Or a candidate for monitoring may be chosen among common search spaces according to the following options, and if there is room for BD/CCE, the PDCCH may still be mapped to the search space set with respect to the USS afterwards.

Option 1) It may be assumed that previously configured common search spaces do not exceed the BD and CCE limit even in a BFR slot. This may indicate that even if the network performs BD and channel estimation in the BFR slot for a candidate related to BFR, the number of BDs and CCEs for the common search spaces are set at least not to exceed a limit configured previously.

Option 2) If the number of BDs and CCEs in the common search spaces exceeds a limit configured previously due to the number of BDs and CCEs due to a BFR search space set, search space set level drop may be applied for the common search space(s). At this time, priority among search space sets may be determined by search space 1 (for example, it is assumed that a low (high) search space index has high priority), DCI format (for example, priority is defined for each DCI format), and so on.

For example, suppose a BD limit and a CCE limit defined within one slot are denoted by $X_{slot}$ and $Y_{slot}$, respectively; and the numbers of BDs and CCEs configured for a BFR search space set are denoted by $X_{BFR}$ and $Y_{BFR}$. Then the numbers of BDs and CCEs allowed for the common search space(s) configured for the corresponding slot may be obtained by $X_{CSS}$ (=$X_{slot}$-$X_{BFR}$), $Y_{CSS}$ (=$Y_{slot}$-$Y_{BFR}$) respectively. At this time, among common search spaces configured for the corresponding slot, if the numbers of BDs and CCEs of a common search space set having the highest priority are smaller than $X_{CSS}$ and $Y_{CSS}$, blind decoding of the corresponding common search space may be performed. Afterwards, $X_{CSS}$ and $Y_{CSS}$ values are updated, and the corresponding process may be repeated for a common search space having the second highest priority until one of the two limits is exceeded. BD may not be performed for a common search space that exceeds the limit.

Candidate drop at a candidate level may also be included in the option 2).

Option 3) If monitoring of a BFR search space set and one or more common search space sets is configured in a specific slot; and the number of BDs and/or CCEs due to the BFR search space set and the number of BDs and/or CCEs due to the common search space set(s) exceed the corresponding limit, monitoring of the common search space may not be performed.

Option 4) Monitoring of a BFR CORESET/SS may be included additionally to UE capability. In other words, a BFR CORESET/SS may assume that a UE is additionally capable of performing channel estimation/BD beyond its previous capability as much as configured and may not consider channel estimation/BD limit. This indicates that capability with respect to a BFR CORESET and search space set may be defined separately, or that BFR-related BD/channel estimation is assumed to be always performed independently of BD/channel estimation for a normal DCI. A limit for BD and channel estimation may be applied to the remaining CORESETs/search space sets except for the BFR CORESET/search space set.

Option 5) In a slot where monitoring of a BFR CORESET is performed, it may be predefined or indicated through higher layer signaling so that only a candidate corresponding to a specific RNTI among candidates of an existing CORESET/search space set is monitored. For example, in a slot where monitoring of a BFR CORESET is performed, it may be configured so that only a PDCCH candidate related to SFI from a previously configured CORESET/search space set is monitored. In addition, if the BD/CCE limit is exceeded at the time of monitoring of an existing CORESET, monitoring of the existing CORESET may not be performed.

Option 6) In a slot where a BFR CORESET has to be monitored, it may be predefined or indicated through higher layer signaling so that monitoring of other CORESETs except for the BFR CORESET is not performed.

[Rx Beam Priority]

As described above, in NR, limits for the numbers of BDs and CCEs are defined in terms of UE complexity, and if the corresponding limits are exceeded in a specific slot, monitoring of part of monitoring candidates may be skipped. A technique based on the operating scheme above may also be applied for an Rx beam used for specific time resources.

In some implementations of NR systems, monitoring of a plurality of CORESETs may be performed in the same slot. In such implementations, scenarios may occur where the CORESETs may be overlapped with each other in the time/frequency domain. Also, for each CORESET, a different Quasi Co-Location (QCL) assumption may be applied (namely, TCI state for a PDCCH may be set differently for each CORESET).

This implies that a plurality of CORESETs that have to receive different Rx beams at the same symbol may be included. However, a UE that implements only one RF panel may be capable of receiving only one Rx beam from a specific time resource. In such implementations, the UE may need to select one Rx beam among the plurality of Rx beams. Receiving a signal by using a specific Rx beam may indicate that a spatial filter is applied for receiving a specific signal from a viewpoint of UE implementation. The aforementioned QCL assumption or TCI may be regarded as information related to the spatial filter application.

The present disclosure describes techniques for configuring one Rx beam among a plurality of Rx beams, for example to address the scenario described above. This operational scheme of the described technique may be interpreted so that when a plurality of TCI states are set to the same time domain resource, priorities of the corresponding TCI states are configured, and a TCI state having the highest priority is applied to the corresponding time domain resource. Also, this operational scheme may also be interpreted as configuring the priorities of a plurality of CORESETs that overlap in the time domain. As such, a particular Rx beam may be selected from among the plurality of Rx beams according to a selection technique that is based on such priorities.

If an Rx beam that a UE applied is determined (or TCI state is determined) by the following technique, network may perform transmission in the CORESET associated with the corresponding Rx beam, or in the case of a CORESET in which an improper Rx beam is used, reception performance may be compensated for through coding rate or power boosting.

Figure 12:
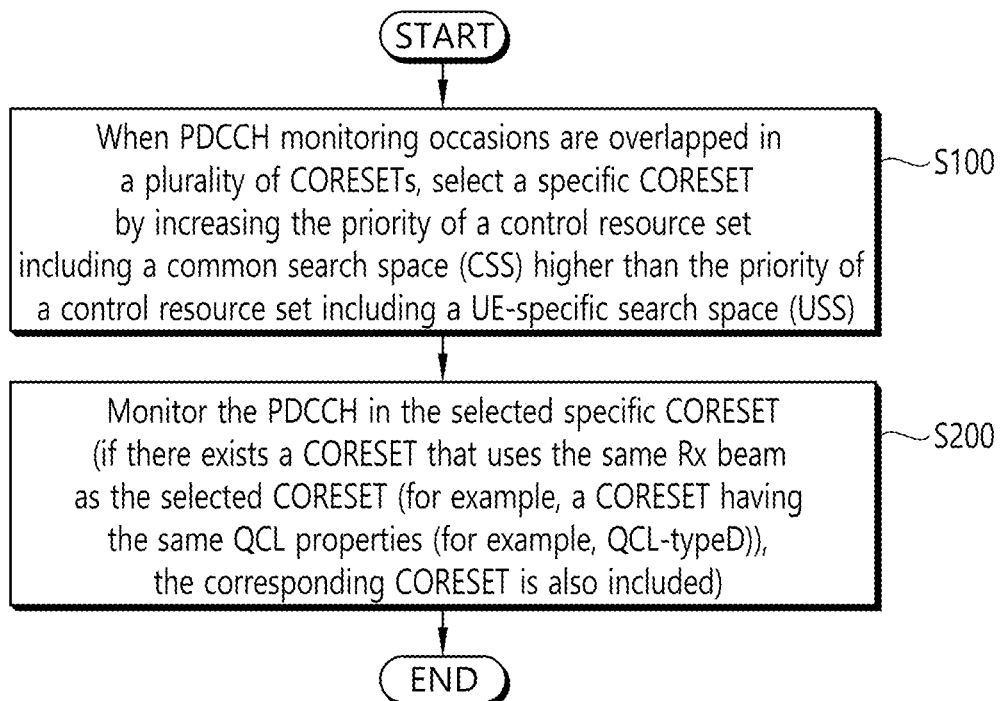
FIG. 12 illustrates an example of a physical downlink control channel (PDCCH) monitoring technique of a user equipment (UE) according to one implementation of the present disclosure.

FIG. 12 illustrates an example of a PDCCH monitoring technique of a UE according to one implementation of the present disclosure.

Referring to FIG. 12, when PDCCH monitoring occasions overlap with each other in a plurality of CORESETs, a UE selects a specific CORESET by increasing the priority of a CORESET including a common search space (CSS) to be of higher priority than the priority of a CORESET including a UE-specific search space (USS) 121.

The PDCCH is monitored in the selected specific CORESET (if there exists a CORESET that uses the same Rx beam as the selected CORESET (for example, a CORESET having the same QCL properties (for example, QCL-typeD)), the corresponding CORESET is also included) S122.

In what follows, specific options (techniques) for selecting at least one CORESET among the plurality of CORESETs are described. In what follows, for the convenience of descriptions, each option is described separately, but the following options may be used separately or in the form of combinations thereof.

Option 1) Measurement-Based Priority

A UE may configure an Rx beam at the corresponding time resource based on measurement and report result. For example, one symbol in the time domain may be mapped to three CORESETs in the frequency domain. In other words, three CORESETs may overlap in the time domain. In this case, when QCL assumption is different for each CORESET, an Rx beam at the corresponding symbol may be configured based on the best measurement result among measurement results associated with the respective CORESETs. As one example, an Rx beam (or TCI state) associated with a CORESET having the highest RSRP value among the RSRP values measured from the respective CORESETs (or RSRP value of a signal configured to a TCI state of each CORESET) may be applied to the corresponding symbol. In option 1, an Rx beam may be determined based on current measurement of a UE or determined based on a measurement result most recently reported. By reporting a value measured from each CORESET to a gNB, the UE may let the gNB (network) know the Rx beam to be selected by the UE.

Option 2) Priority Based on CORESET/Search Space Set Index

By assigning priority to a CORESET index or search space set index, Rx beam to be applied to the corresponding resource may be determined. For example, a UE may configure an Rx beam based on a CORESET with the lowest (or highest) CORESET index or the TCI state of a CORESET associated with the lowest search space set index.

Option 3) Message-Based Priority

A UE may configure an Rx beam based on the priority (for example, DCI format, RNTI, and BFR) of a message that has to be monitored in each CORESET. For example, an Rx beam of a CORESET monitoring DCI related to SFI, pre-emption, and so on may have higher priority than an Rx beam of a CORESET monitoring non-fallback DCI.

As another example, an Rx beam of a CORESET monitoring information needed for maintaining communication of a UE such as RACH/SI update/paging may be configured to have higher priority.

As yet another example, the search space set type such as CSS/USS may be considered as an element for determining priority. More specifically, CSS may have higher priority than USS.

For the case of a CORESET related to beam failure recovery (or beam management), the highest priority may be assigned irrespective of the CORESET priority within a slot that has to perform monitoring.

For example, i) if a UE is configured for single cell operation or for operation with carrier aggregation in the same frequency band, ii) if the UE monitors PDCCH candidates in overlapping PDCCH monitoring occasions in multiple CORESETs that have same or different QCL properties (for example, QCL-TypeD properties) on active DL BWP(s) of one or more cells, the UE may monitor the PDCCH only in the CORESET on the active DL BWP of a cell with the lowest index among one or more cells corresponding to the CSS set with the lowest index (if there exists other CORESET having the same QCL properties (QCL-TypeD properties) with the CORESET among the plurality of CORESETs, the other CORESET is also included).

The lowest USS set index may be determined for all of the USS sets having at least one PDCCH candidate among overlapped PDCCH monitoring occasions.

For example, a UE that monitors a plurality of search spaces (also referred to herein as search sets) associated with different CORESETs may perform a single cell operation or a carrier aggregation operation within the same frequency band. In this case, if monitoring occasions of the search space (set) overlap in the time domain, and the search spaces are associated with different CORESETs having different QCL-TypeD properties, the UE monitors the PDCCH in a CORESET corresponding to (including) a CSS (set) with the lowest index in an active DL BWP of a serving cell with the lowest serving cell index including the CSS. At this time, the UE may monitor a different CORESET with the same QCL-TypeD properties as the QCL-TypeD properties of the given CORESET. For example, if two or more CORESETs include a CSS (set) respectively, then the UE may select a CORESET that includes a search space with the lowest index (or ID) among monitoring occasions in an active DL BWP of a serving cell with the lowest serving cell index. In such scenarios, the UE may monitor overlapping search spaces associated with CORESETs having the same QCL-TypeD properties as the CORESET.

If none of CORESETs includes a CSS, then a UE may select a CORESET that includes an USS with the lowest index (or ID) at a monitoring occasion in an active DL BWP of a serving cell with the lowest serving cell index. In such scenarios, the UE may monitor overlapping search spaces associated with the CORESETs having the same QCL-TypeD properties. To this end, when a CSI-RS originates from an SSB, the QCL-TypeD for the SSB and QCL-TypeD for the CSI-RS (or TRS) may be regarded as being different from each other.

In some implementations, an unselected search space may be regarded as dropping the whole search space (rather than puncturing that does not monitor only the overlapping part of the search space).

Allocation of non-overlapping CCEs and PDCCH candidates for PDCCH monitoring may be determined according to the entire search space sets associated with a plurality of CORESETs on active DL BWP(s) of one or more cells. The number of active TCI states may be determined from the plurality of CORESETs.

The UE may decode a PDSCH according to a (detected) PDCCH that includes DCI of the UE and may be configured with a list that includes up to M TCI-state configurations within a higher layer parameter called 'PDSCH-config' for the decoding. And the M value may be dependent on the UE capability (for example, the maximum number of TCI states that may be activated for each BWP).

Here, each TCI state may include parameters for configuring a quasi co-location (QCL) relationship between (one or two) reference signals and DM-RS ports of the PDSCH. The quasi co-location relationship may be configured by the higher layer parameter qcl-Type1 for a first downlink reference signal (DL RS) and (if configured) the higher layer parameter qcl-Type2 for a second downlink reference signal (DL RS). QCL types may not be the same for the two downlink reference signals. The quasi co-location type corresponding to each downlink reference signal may be given by a higher layer parameter qcl-Type (which is included in the QCL-Info) and may be one of QCL-TypeA, QCL-TypeB, QCL-TypeC, and QCL-TypeD.

A UE may receive an activation command that is used for mapping up to 8 TCI states to the code points of DCI field 'Transmission Configuration Indication'. If an HARQ-ACK corresponding to a PDSCH that carries the activation command is transmitted from slot n, mapping between the code point of the DCI field 'Transmission Configuration Indication' and the TCI state may be applied after a predetermined time period is passed (for example, from slot n+3 $N^{subframe, \mu_{slot}}+1$). After receiving an initial higher layer configuration of the TCI state and before receiving the activation command, the UE may assume that DM-RS ports of a PDSCH of a serving cell are at a quasi co-location with an SS/PBCH block determined from the initial access procedure for 'QCL-TypeA'. If applicable, the operation above may be the same for 'QCL-TypeD'.

Option 4) Priority Due to Time Order of Monitoring Occasions

A UE may apply an Rx beam associated with a first encountered search space set according to a search space set monitoring order of each CORESET. In other words, priority of each CORESET may be determined according to a start symbol index of the CORESET. If the same CORESET is associated to a plurality of search space sets and has the same start symbol, an Rx beam may be determined based on the priority such as a search space set index.

In other words, as the start symbol index of an associated CORESET among search space sets that have to be monitored becomes lower (or higher), the associated CORESET may have high priority.

Option 5) Priority of a CORESET May be Determined According to the Number of Search Space Sets Associated with the CORESET.

As described above, in NR, 3 CORESETs and 10 search space sets may be configured for each BWP, which indicates that a plurality of search space sets may be associated with one CORESET. Option 5 is related to a technique for allocating high priority to a CORESET with which a large number of search space sets are associated under a condition where a plurality of search space sets associated with a plurality of CORESETs have to be monitored in a specific slot, and TCI state of each CORESET is different from each other. At this time, the number of associated search space sets may be limited to the search space sets that perform monitoring in the corresponding slot.

Option 6) Priority of a CORESET May be Determined Based on TCI State.

In other words, priority may be determined by the TCI state set to each CORESET. As one example, among TCI states set by an RRC signal, the TCI state with a lower (or higher) index may be set to have higher priority. Or to apply the most recent information of a channel status, the TCI state that has most recently been configured in time order may be set to have the highest priority. A gNB may inform of part of TCI states (for example, 8) among a plurality of predetermined TCI states (for example, 64) through an RRC message and inform of one from among the part of TCI states through a MAC CE. Or, the gNB may directly inform of one from among a plurality of predetermined TCI states through an RRC message.

In another technique, priority may be determined according to a technique for determining the TCI state of each CORESET, which may be regarded as a technique that puts high priority to the TCI state in which channel change may be quickly dealt with. For example, a CORESET for which the TCI state is chosen through MAC CE signaling from among a plurality of TCI states indicated by an RRC signal for a specific CORESET may have higher priority than a CORESET for which the TCI state is configured only through RRC signaling.

In addition, when a priority rule is determined as described above, a CORESET with low priority may have reduced monitoring occasions in a way that monitoring is not performed in a slot where overlap is occurred or may experience performance degradation with an increased frequency. Therefore, the present disclosure additionally describes changing the priority rule periodically or non-periodically. This change may be performed in a predefined manner or by an indication of the network. For example, a slot (subframe or frame) index may be used as a criterion for changing the priority rule. As one example, if the option 2) is applied, and the slot index is an odd number, high priority is set to the CORESET associated with a search space set with a low index while, if the slot index is an even number, high priority may be set to the CORESET associated with a search space set with a high index. Then an advantage may be obtained that monitoring occasions for a specific CORESET or a specific search space set are prevented from being reduced due to priority.

The descriptions above describe a technique for selecting which TCI state to configure an Rx beam when CORESETs having different TCI states on a specific time resource are configured the same. When a CORESET has both of the time resource overlapping a different CORESET and the time resource existing only in the corresponding CORESET, the present disclosure additionally describes a technique for configuring an Rx beam with respect to each region.

Figure 13:
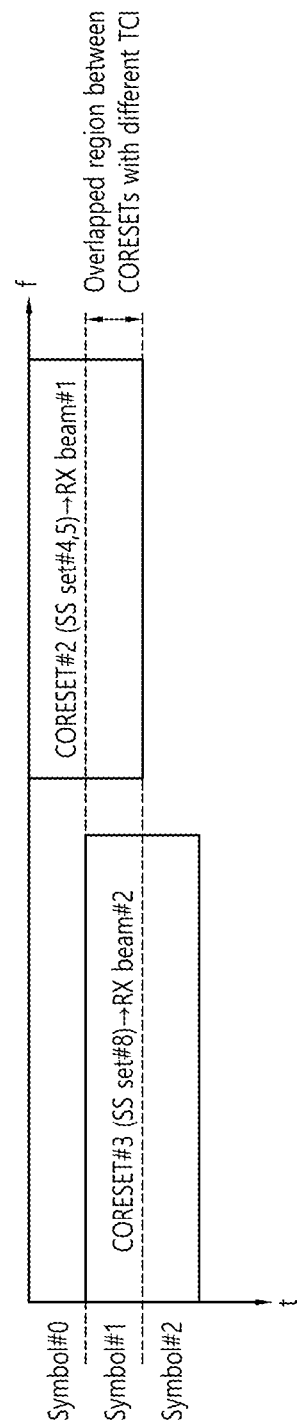
FIG. 13 illustrates an example of a case where two different CORESETs configured with different TCI states overlap each other in the time domain.

FIG. 13 illustrates an example of a case where two different CORESETs configured with different TCI states overlap each other in the time domain.

As shown in FIG. 13, when monitoring is performed on each CORESET, a UE applies different Rx beams, and when two CORESETs are overlapped, an Rx beam that has to be applied by the UE (or TCI state that has to be assumed by the UE) may be determined according to the described priority rule.

For example, if the priority of CORESET #2 of FIG. 13 is high, a UE may apply Rx beam #1 in the overlapped region. However, in this case, which Rx beam to use for reception has to be determined at symbol #2 of CORESET #3. To this purpose, the present disclosure describes following options, which may be implemented separately or in the form of a combination thereof. To configure an Rx beam of a specific CORESET may indicate to configure an Rx beam suitable for the TCI state of the corresponding CORESET.

In addition, the following options may be performed for each set of a CORESET for each slot. For example, each set may be composed of CORESETs overlapped partly or completely with each other in the time domain, and all of the CORESETs existing within one slot may comprise one set.

Option 1) Configuration of Rx Beam According to Priority for Each Time Resource

Based on the TCI state of a CORESET with the highest priority at each time resource (for example, OFDM symbol), an Rx beam at the corresponding time resource may be configured. In this case, there are times that the same precoding may not be assumed for neighboring symbols due to different Rx beams within the same CORESET, and it may be assumed that time domain REG bundling is not applied in the corresponding CORESET. Or it may be assumed that time domain bundling is applied only within a time resource that uses the same Rx beam.

Option 2) It is related to a technique for applying an Rx beam with respect to a CORESET with the highest priority among overlapping CORESETs to a plurality of CORESETs including the overlapped region.

With respect to the CORESETs including the same time resource, option 2 may configure an Rx beam for the entire overlapping CORESETs based on the TCI state of a CORESET with the highest priority among the corresponding CORESETs. It may indicate that CORESETs not overlapped in the time domain (for example, at symbol level) may configure an Rx beam based on the TCI state of each CORESET.

Option 3) When a plurality of CORESETs having different TCI states in one slot exist, the TCI state of a CORESET determined to have the highest priority according to the described priority rule may be applied to the whole of the corresponding slots. It may indicate that when different CORESETs configured with different TCI states are monitored in the same slot, a CORESET with low priority may change an Rx beam only for the case of the corresponding slot (namely by assuming a TCI state different from the configuration).

Option 4) It may be assumed that a UE performs monitoring only for candidates of search space sets belonging to a CORESET with the highest priority when CORESETs configured with different TCI states are overlapped partly or completely in the time domain. Also, it may indicate that monitoring of CORESETs not overlapped in the time domain may have to be performed according to the configuration. Or it may be interpreted that when CORESETs that have to assume different Rx beams in the corresponding slot are overlapped, monitoring is performed only for a CORESET with the highest priority over the whole of the corresponding slot.

When a BFR CORESET/search space set has to be monitored, and the TCI state at the corresponding BFR CORESET is different from an existing CORESET (namely a CORESET/search space set configured to perform monitoring before BFR), the option 4 may include a case where the corresponding slot performs monitoring of only the BFR CORESET. Also, the option may include a case where existing CORESETs and BFR CORESET are monitored in the same slot, and when a particular CORESET among the existing CORESETs uses the same Rx beam as the BFR CORESET, monitoring of the corresponding CORESET is performed.

For example, a UE may select a first CORESET including a search space with the lowest index (or ID) at the monitoring occasion of an active DL BWP of a serving cell with the lowest serving cell index. At this time, overlapping search spaces associated with other CORESETs having the same QCL-TypeD properties as the first CORESET may also be monitored, which eventually indicates that in the existence of CORESETs using the same Rx beam as the first CORESET, PDCCH monitoring is also performed for the CORESETs.

<QCL Assumption for CORESET without TCI-State PDCCH>

Information Element (IE) called "ControlResourceSet" may be provided for each CORESET. And to provide a QCL relationship between a CORESET and DL RS/SSB, a parameter called "tci-StatesPDCCH" may be configured within the IE.

However, since the "tci-StatesPDCCH" is an optional parameter, the parameter may not be configured for part of a plurality of CORESETs. Such a CORESET may be referred to as a TCI-less CORESET, and a default QCL assumption is needed to determine an Rx beam for receiving a PDCCH in a TCI-less CORESET.

With respect to a TCI-less CORESET, a UE may assume QCL from a CORESET for which the most recent RACH process has been applied as the default QCL.

With respect to a BFR-CORESET (for a beam failure recovery process), a UE may assume that a DL RS of a candidate beam identified by the UE upon request of beam failure recovery and the dedicated CORESET are spatially QCLed.

In terms of PDCCH, for a BFR-CORESET, it may indicate that implicit spatial QCL update (irrespective of CORESET configuration) through beam failure recovery and/or beam management process is assumed.

Besides the BFR-CORESET, it is necessary to clarify which CORESET is not associated with TCI states. For example, CORESET #0 (by PBCH) and CORESET #1 (by RMSI) may not be associated with TCI states. In general, it is preferable that TCI states are configured in the case of other CORESETs for USS operations.

In some scenarios, it may also be necessary to clarify whether a RACH process may include free-contention. Free-contention may be implemented based on a CSI-RS without involving an SSB, and QCL associated with the CSI-RS may not be reliable for CORESET #0 and/or CORESET #1. Therefore, it may be safer to change QCL information based on the recent contention-based RACH process at least for the CORESET #0 and the CORESET #1.

In other words, a QCL assumption derived from the most recently performed RACH process may be applied to the CORESET for which 'tci-StatesPDCCH' has not been configured.

In what follows, more specifically, a technique for deriving a QCL assumption is described additionally. In what follows, contention-based RACH may indicate that a RACH process at a resource associated with the best SSB (from a measurement result) is performed based on SSBs. A contention-free RACH process may indicate a case where a RACH process is performed at a resource associated with a CSI-RS port (or SSB) by signaling of a gNB.

Since a contention-free RACH process is based on a network configuration, signaling may be performed irrespective of measurement, or the network may perform signaling based on a measurement report of a UE. Also, in the case of a CSI-RS port, association with an SSB may or may not be signaled. In other words, a contention-free RACH process may not be able to confirm association with an SSB and reflection of a measurement result. This may act as a factor that degrades, in conjunction with an SSB, performance of the operation of a CORESET and CORESET #0 and #1 for which a search space set may be configured. For example, there are times that a UE configures an Rx beam based on the assumption of an erroneous transmission beam.

1. A UE may apply a QCL assumption derived from the most recently performed RACH process to a TCI-less CORESET irrespective of the type (namely contention-based/contention-free RACH process) of RACH process.

2. A UE may apply the QCL assumption of a TCI-less CORESET only to the result derived from the most recently performed contention-based RACH process. For example, if the most recently performed RACH process is in fact contention-free, the UE may ignore the corresponding result and apply the QCL assumption derived from the most recently performed contention-based RACH process to the corresponding CORESET.

3. For each CORESET, a QCL assumption of a different RACH process may be used. For example, CORESET #0 (and/or #1) may apply the QCL assumption derived from the most recently performed contention-based RACH process while the remaining CORESETs may derive a QCL assumption from the most recently performed RACH process irrespective of contention.

As another example, a CORESET for which a CSS is configured may apply a QCL assumption derived from the most recently performed contention-based RACH process while a CORESET for which a USS is configured may derive a QCL assumption from the most recently performed RACH process irrespective of contention. At this time, a QCL assumption may be applied, which is derived from the most recently performed contention-based RACH process of a CORESET for which both of the CSS and USS are configured.

4. Even though the described techniques are based on a contention-free RACH process, if an associated SSB is indicated, or an implicitly associated SSB is known, a QCL assumption derived from the corresponding contention-free RACH process may be applied to a TCI-less CORESET.

In addition, according to the present disclosure, through higher layer signaling, the network may inform a UE of from which RACH process type a QCL assumption is derived with respect to a TCI-less CORESET. At this time, a technique for informing a UE of the SSB information associated with a CSI-RS port given during a contention-free RACH process may also be included.

<QCL Assumption Between Overlapped CORESETs in Time Domain>

Each CORESET may have its own QCL assumption. And different CORESETs may be overlapped in the time domain and/or frequency domain. This may indicate that CORESETs having different QCL assumptions may be overlapped in the same symbol.

A UE determines an Rx beam for monitoring each CORESET by taking into account the TCI state of the CORESET. Therefore, if CORESETs having different QCL assumptions are overlapped at a resource in the time domain (for example, OFDM symbol), the UE may have to support a plurality of Rx beams or have to select one Rx beam (or TCI state) according to a specific selection rule. Until now, UEs that use a plurality of Rx beams are not considered. Therefore, the following options may be considered.

Option 1) Skip Monitoring of a CORESET with Low Priority

A CORESET selection rule may be applied when CORESETs having different (spatial) QCLs are overlapped at a time resource. And a UE may skip monitoring candidates included in an unselected CORESET. Priority of each CORESET may be determined according to, for example, CORESET ID, the number of search space sets associated with the CORESET, and associated search space type. Search space type may be divided into Common Search Space (CSS) and UE-specific Search Space (USS). A monitoring occasion for a PDCCH may be configured by a combination of a CORESET and a search space set associated with the CORESET. For example, a CSS may be associated with a first CORESET, and an USS may be associated with a second CORESET; and when the first and the second CORESETs are overlapped in the time domain, a UE may monitor only the first CORESET.

Option 2) Representative Spatial QCL for Overlapped CORESETs

Option 2 may arrange overlapped CORESETs according to the priority rule of the option 1 and change the QCL state in a CORESET with low priority instead of deleting the CORESET with low priority. In other words, for overlapped CORESETs, the same spatial QCL is assumed, and by using the CORESET priority mentioned in the option 1, a representative QCL may be selected. In other words, the QCL assumption for overlapped CORESETs may follow the QCL of a CORESET with the highest priority. Although this option may provide more PDCCH transmission and reception occasions, PDCCH performance of a CORESET with low priority may be decreased due to inconsistency between a transmission beam and an Rx beam.

Option 3) Technique that does not Allow Overlap of CORESETs Having Different Spatial QCLs A UE may assume that the network does not schedule overlapped CORESETs having different spatial QCLs. However, it is not certain that overlap may always be avoided through scheduling.

<Candidate Mapping for Case 2 where Monitoring Occasions for the Same Search Space of the Same CORESET in One Slot are Configured Multiple Times>

The number of CCEs for channel estimation for each slot of case 2 may be the same as case 1. The case 1 describes a situation where only one monitoring occasion may be configured in one slot. In other words, for both of the case 1 and 2, the number of CCEs for channel estimation for each slot may be {56, 56, 48, 32} in a sequential order with respect to the subcarrier spacing (SCS) {15 kHz, 30 kHz, 60 kHz, 120 kHz}.

The case 1 or case 2 may be configured for a UE. A UE may be configured to monitor search space sets with respect to the case 1 and 2. For example, common information may be transmitted through resources (slot-based scheduling) shared between eMBB and URLLC. And service-specific data may be transmitted by slot-based scheduling for eMBB and transmitted by non-slot based scheduling for URLLC. In this case, URLLC UEs may receive two types (namely case 1 and case 2).

Proposal 1: A UE may be configured to monitor both of the case 1 search space set and case 2 search space set, and the search space sets may be monitored within one slot.

Proposal 2: The maximum number of CCEs for channel estimation for each slot, for each UE, and for each component carrier may be {56, 56, 48, 32} in a sequential manner with respect to sub-carrier spacing {15 kHz, 30 kHz, 60 kHz, 120 kHz} irrespective of CORESET/SS configuration. This may be applied the same for a BD limit.

<Candidate Mapping in Case 2>

If the number of BDs/CCEs configured in the SS set configuration is almost the same between the case 1 and 2, the number of required BDs/CCEs of the case 2 is normally much larger than that of the case 1. From the viewpoint of counting the number of CCEs with respect to a search space set of the case 2, the number of CCEs required for each monitoring occasion has to be multiplied by the number of monitoring occasions within one slot. Therefore, when search space set level channel estimation/BD processing is used together for the case 2, the total number of monitoring occasions of the case 2 may be reduced particularly when a large number of monitoring occasions are given. To relieve such an effect, monitoring occasion-based candidate selection may be additionally taken into account (for example, part of monitoring occasions may be dropped).

Proposal 1: Search space set-level PDCCH mapping within a slot may also be used for BD/CE complexity processing with respect to the case 2.

\<BFR CORESET/Search Space Set\>

A BFR CORESET and its associated search space set may be formed for the beam failure recovery procedure. The BFR CORESET/search space set is activated by the beam failure recovery procedure, and a UE may not expect PDCCH candidate monitoring in the BFR CORESET before the beam failure recovery procedure (for example, PRACH transmission) and after configuration of a new CORESET/search space set or update of TCI.

Meanwhile, it is not certain whether PDCCH monitoring is performed in an existing CORESET (namely a CORESET configured to be monitored before the BFR procedure) in a monitoring window of the BFR CORESET. Since common information (for example, SFI, system information, and paging) may not be monitored in the BFR CORESET, it is preferable that a UE may monitor a PDCCH candidate of the existing CORESET even in the BFR CORESET monitoring window.

Proposal 2: A UE may continue monitoring in an active CORESET other than a BFR CORESET during the BFR process.

The TCI state of a CORESET may be expected to be updated only through an explicit configuration. Therefore, during the BFR process, a UE may monitor a CORESET in an old TCI state. When a BFR CORESET and other CORESETs are monitored at the same time resource together with potentially different QCL/TCI information (therefore, when a potentially different Rx beam is derived), a processing technique therefor is needed. A simple solution is that a UE skips the old CORESET monitoring when a BFR CORESET overlaps an old CORESET in the time domain. In other words, when other CORESETs and the BFR CORESET collide with each other, the BFR CORESET is prioritized.

Another problem is related to whether a UE have to count (include) a CCE/BD with respect to a BFR-search space under a channel estimation/BD limit. Some implementations of the present disclosure count (include) a CCE/BD of the BFR-search space at the time of monitoring.

It has been assumed that a CSS has higher priority than an USS in the PDCCH mapping, and the numbers of BDs/CCEs of a CSS do not exceed the respective limits. However, in a slot configured to monitor the BFR CORESET, the number of BDs/CCEs of the BFR CORESET may have to be regarded as a PDCCH mapping rule. The BFR CORESET/search space set may have the highest priority among the PDCCH mapping rules, and an existing PDCCH mapping rule may be applied to other search space sets. Then unless a sum of CCEs of the CSS and BFR-search space is guaranteed not to exceed a limit of a UE, the CSS may have to be deleted when the BFR-search space is monitored. In order not to cause too much configuration flexibility, the CSS may be dropped based on a search space set index when the BFR-search space is monitored.

Proposal 3: If a BFR CORESET overlaps other CORESET in the time domain, and at least QCL information is different between the BFR CORESET and the other CORESET, a UE doesn't have to monitor the other CORESET for a PDCCH candidate.

Proposal 4: When a BFR CORESET/search space set is monitored, it may have the highest priority (irrespective of the search space type) with respect to the PDCCH candidate mapping rule. A CSS associated with other CORESET may be dropped according to a search space set index while the BFR search space is being monitored.

In the descriptions above, it has been described that when a plurality of CORESETs configured with different TCI states are overlapped partly or completely in the time domain, the TCI state in the overlapped region is assumed according to the priorities of the CORESETs. Additionally, the present disclosure describes a technique for applying the priority rule described above. The techniques described below may be applied to the options that do not perform monitoring for CORESETs with low priority among the options described above.

\<TCI Assumption Among Overlapped CORESETs\>

Technique 1) TCI Assumption Due to Reporting of UE

Figure 14:
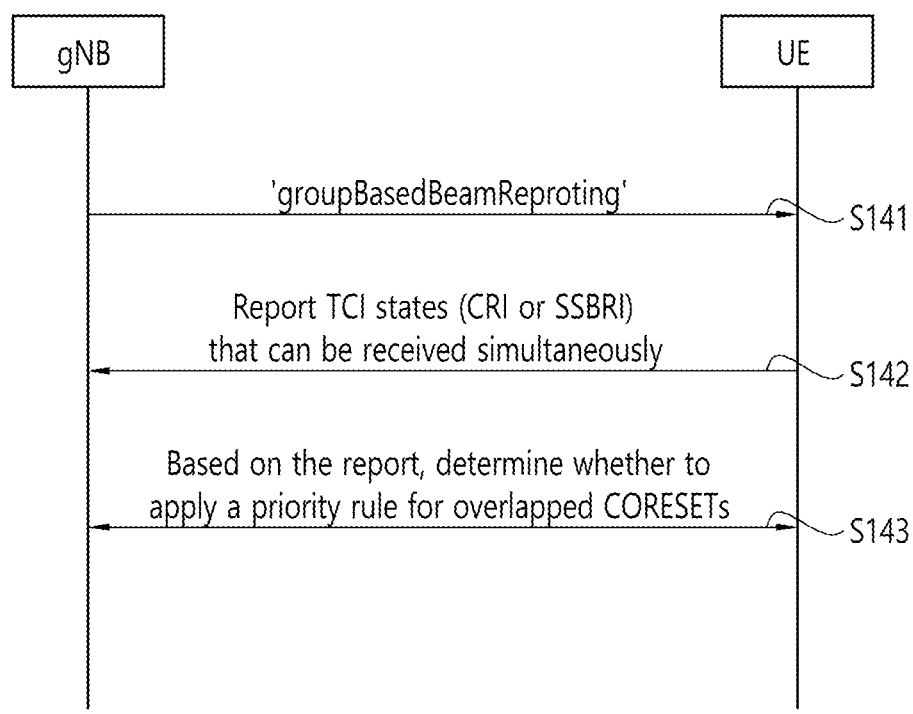
FIG. 14 illustrates an example of an operation technique between a gNodeB (gNB) and a UE according to one implementation of the present disclosure.

FIG. 14 illustrates an example of an operation technique between a gNB and a UE according to one implementation of the present disclosure.

Referring to FIG. 14, a gNB (or network) may transmit a specific parameter, for example, a parameter called "groupBasedBeamReporting" to a UE S141. By using the parameter, the gNB may configure whether the UE reports a beam group that may be received simultaneously.

For example, when a UE is configured with 'CSI-REportConfig' for which a higher layer parameter 'reportQuantity' is configured with 'cri-RSRP' or 'SSB-Index-RSRP', 1) If the parameter 'groupBasedBeamReporting' is set to 'disabled', the UE is not requested to update measurement of resources larger than 64 resources (CSI-RS or SSB), but for each report configuration, the UE may have to report a different CSI-RS resource indicator (CRI) or SSB resource indicator (SSBRI) via a single report 'nrofReportedRS'.

2) If the parameter 'groupBasedBeamReporting' is set to 'enabled', the UE is not requested to update measurement of resources larger than 64 resources (CSI-RS or SSB), but for each report configuration, the UE may have to report two different CRIs or SSBRIs via a single report occasion (time). Here, the UE may receive the CSI-RS and/or SSB resources simultaneously by using a single space region reception filter (RX beam) or by using multiple space region reception filters.

If the higher layer parameter 'groupBasedBeamReporting' is set to 'enabled', the UE may report TCI states (CRI or SSBRI) that may be received simultaneously S142. For example, the UE may report two different CRIs or SSBRIs in one report. This indicates that the UE may receive two reported TCI states related to the CSI-RS or SSB simultaneously. In this case, whether the UE receives the TCI states by using the same Rx beam or different Rx beams may not be indicated. This indicates that there are times that the UE receives the TCI states simultaneously even though the TCI states are different from each other, and the UE report the corresponding information to the network.

Based on the report, the gNB and the UE may determine whether to apply the priority rule for overlapped CORESETs S143.

For example, when a plurality of TCI states, which have been reported as being possible to be received by the UE, are set to the same symbol, the aforementioned priority rule may not be applied. In other words, when the CORESETs having different TCI states are overlapped in the time domain, if the TCI states of the CORESETs may be received simultaneously by the UE, control channel monitoring may be performed for all of the CORESETs without applying the aforementioned priority rule. On the other hand, when TCI states of overlapped CORESETs may not be received simultaneously, the priority rule described above may be applied. In other words, it may indicate that if CORESETs with different TCI states are overlapped in the time domain (symbol), whether to apply the priority rule for CORESETs or TCI states at the overlapped symbol may be determined based on a (beam group) report of the UE.

Even through TCI states of overlapped CORESETs are configured differently, and the UE is able to receive the corresponding TCI states by using the same Rx beam, if a combination of the corresponding TCI states does not coincide with a beam group that the UE has reported (namely in the case of an unreported combination), the TCI state of an overlapped region may be assumed according to the described priority rule. This indicates that the priority rule described above may be applied based on an Rx beam of the UE (which is commonly recognized by the network and the UE).

Technique 2) TCI Assumption Based on Signaling of Network

The description above describes determining whether to apply a priority rule to overlapped CORESETs based on reporting of a UE. As another technique, the present disclosure describes determining whether to apply the aforementioned priority rule based on signaling of the network.

In NR, the network may signal the QCL relationship between a Tracking Reference Signal (TRS), CSI-RS (for BM, CSI, or tracking), and SSB by using a higher layer signal such as an RRC signal. The QCL types defined in NR are as follows. The QCL types have already been described with reference to Table 4.

1) 'QCL-TypeA': {Doppler shift, Doppler spread, average delay, delay spread}, 2) 'QCL-TypeB': {Doppler shift, Doppler spread}, 3) 'QCL-TypeC': {average delay, Doppler shift}, 4) 'QCL-TypeD': {Spatial reception parameter}

The network may indicate the QCL relationship among different RSs by using the technique described below. In the example of Table 6, below, a notation such as 'A→B' may indicate that A and B assume type D QCL, and A acts as a reference of B.

QCL with respect to a DMRS of a PDCCH may be given by SSB, TRS, and SCI-RS for beam management. Also, a QCL reference for CSI-RS may be included in the CSI-RS configuration; and SSB, TRS, CSI-RS, and so on may be configured as the QCL reference.

The present disclosure describes applying a QCL combination, known to a UE through RRC signaling, also to a CORESET. In particular, the present disclosure describes determining whether to apply the priority rule described above by using a QCL combination of the TCI state of a CORESET included in the corresponding CORESET configuration and the TCI state known through RRC signaling.

For example, when the TCI states of different CORESETs overlapped in the time domain are SSB #2 and CSI-RS #8, respectively, if RRC signaling related to the QCL combination of the network indicates that the SSB #2 and CSI-RS #8 assume type D QCL, the priority rule doesn't have to be applied in the corresponding overlapped region, and the UE may perform blind decoding for each CORESET. On the other hand, if a QCL relationship among the corresponding TCI states is not configured for the RRC signaling of the network, the UE may perform PDCCH mapping by which blind decoding is performed based on the described priority rule.

As another example, if TCI states of different CORESETs overlapped in the time domain are configured to be CSI-RS #5 and CSI-RS #6, respectively; type D QCL reference of the CSI-RS #5 is SSB #4 in the RRC signaling related to the QCL combination of the network; and the type D QCL reference of the CSI-RS #6 is the same as SSB #4, monitoring of each CORESET may be performed without applying the priority rule to the corresponding overlapped region (for example, without performing monitoring skip for a

TABLE 6

| QCL linkage for above 6 GHz | Signalling |
|---|---|
| SSB -> TRS w.r.t average delay, Doppler shift, spatial reception parameters | QCL type: C + D |
| TRS -> CSI-RS for BM(beam management) w.r.t. average delay, Doppler shift, delay spread, Doppler spread estimation | QCL type: A + D |
| TRS -> CSI-RS for CSI w.r.t. average delay, Doppler shift, delay spread, Doppler spread estimation | QCL type: A |
| TRS -> DMRS for PDCCH w.r.t. average delay, Doppler shift, delay spread, Doppler spread estimation | QCL type: A + D |
| TRS -> DMRS for PDSCH w.r.t. average delay, Doppler shift, delay spread, Doppler spread estimation | QCL type: A + D |
| SSB -> CSI-RS for BM w.r.t. average delay, Doppler shift, spatial reception parameters | QCL type: C + D |
| SSB -> CSI-RS for CSI w.r.t, spatial reception parameters | QCL type: D |
| SSB -> DMRS for PDCCH (before TRS is configured) w.r.t. average delay, Doppler shift, delay spread, Doppler spread, spatial reception parameters | QCL type: A + D |
| SSB -> DMRS for PDSCH (before TRS is configured) w.r.t. average delay, Doppler shift, delay spread, Doppler spread, spatial reception parameters | QCL type: A + D |
| CSI-RS for BM -> DMRS for PDCCH w.r.t. spatial reception parameters | QCL type: D |
| CSI-RS for BM -> DMRS for PDSCH w.r.t., spatial reception parameters | QCL type: D |
| CSI-RS for CSI -> DMRS for PDSCH w.r.t. average delay, Doppler shift, delay spread, Doppler spread, spatial reception parameters (QCL parameters may not be derived directly from CSI-RS for CSI) | QCL type: A + D |
| CSI-RS for BM -> CSI-RS for TRS/BM/CSI w.r.t. spatial reception parameters | QCL type: D |

As may be seen from Table 6, the network may inform the UE of the QCL assumption among RSs (for example, SSB, CSI-RS, TRS) that may be defined by TCI states through RRC signaling. As one example, the reference for type D CORESET with lower priority). The UE may derive a type D QCL relationship among TCI states configured for individual CORESETs based on the report of the UE and/or QCL-related signaling of the network.

Figure 15:
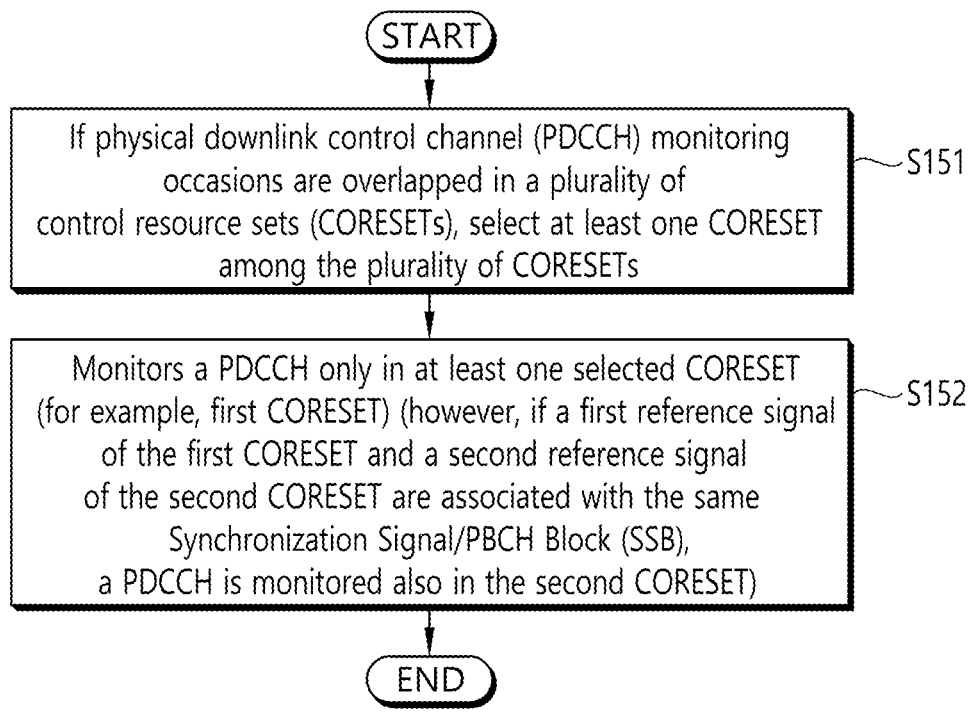
FIG. 15 illustrates an example of a technique for control channel monitoring of a UE according to the present disclosure.

FIG. 15 illustrates an example of a technique for control channel monitoring of a UE according to the present disclosure.

Referring to FIG. 15, if physical downlink control channel (PDCCH) monitoring occasions are overlapped in a plurality of control resource sets (CORESETs), the UE selects at least one CORESET from among the plurality of CORESETs S151.

The UE monitors a PDCCH only in the at least one selected CORESET, and in particular, if a first CORESET is selected as the at least one CORESET, and if a first reference signal of the first CORESET is associated with the same Synchronization Signal/PBCH Block (SSB) as a second reference signal of a second CORESET, then the UE monitors the PDCCH in both the first CORESET and the second CORESET S152.

In some implementation, the UE may assume (for the purpose of determining a CORESET) that the first CORESET and the second CORESET have the same Quasi Co Location (QCL) properties (for example, QCL-TypeD properties). As described above, the QCL-TypeD properties may be related to a spatial receive (Rx) parameter.

In some implementations, the technique of FIG. 15 may be used in combination with the technique of FIG. 12. For example, in selecting the at least one CORESET, a CORESET may be selected by assuming that a priority of a CORESET including a Common Search Space (CSS) is higher than a priority of a CORESET including a UE-specific Search Space (USS).

Also, in some implementations, in selecting the at least one CORESET, if there exist multiple CORESETs including a CSS, then the UE may select a CORESET, from among the multiple CORESETs including the CSS, that has a lowest index.

Also, in some implementations, among the plurality of CORESETs, a CORESET corresponding to a CSS with the lowest index may be selected from a cell that has a lowest cell index and that includes the CSS.

Figure 16:
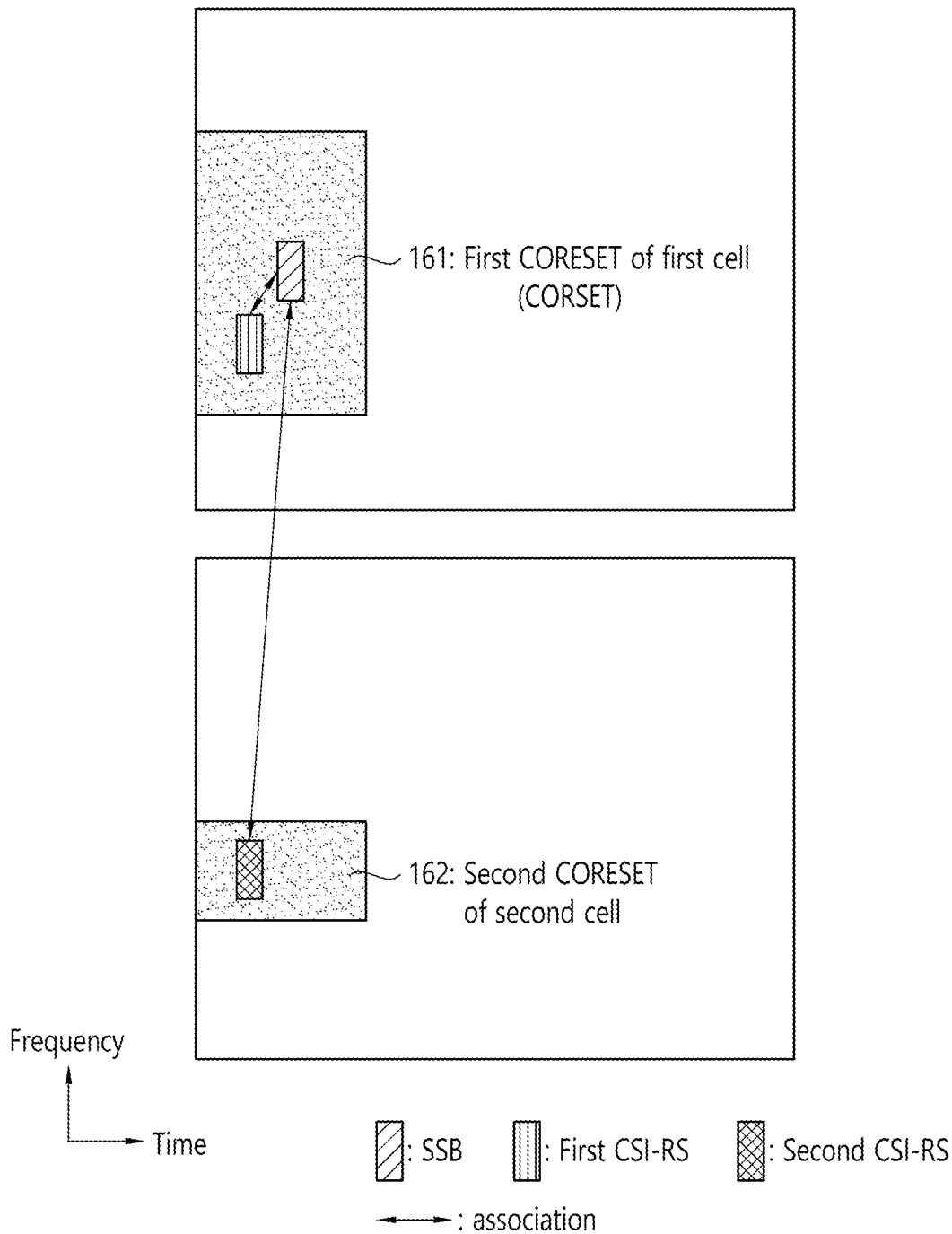
FIG. 16 illustrates an example of two reference signals associated with the same synchronization signal block (SSB) described with reference to FIG. 15.

FIG. 16 illustrates an example of two reference signals associated with the same SSB described with reference to FIG. 15.

Referring to FIG. 16, a first CSI-RS located in a first CORESET 161 of a first cell and a second CSI-RS located in a second CORESET of a second cell may be associated with the same SSB. In this case, the two CSI-RSs may be assumed to have the same QCL-TypeD properties. Regarding the purpose of determining a CORESET, an SS/PBCH block may be regarded as having different QCL-TypeD properties from the CSI-RS. Regarding the purpose of determining a CORESET, the first CSI-RS associated with an SS/PBCH block of the first cell and the second CSI-RS of the second cell associated with the SS/PBCH block may be considered (assumed) to have the same QCL-TypeD properties. If PDCCH monitoring occasions are overlapped in a plurality of CORESETs, the UE may select a specific CORESET (for example, a CORESET corresponding to a CSS set with the lowest index in a cell with the lowest index containing a CSS) and monitor a PDCCH only in the specific CORESET. At this time, if a different CORESET has the same QCL-TypeD properties as the specific CORESET, a PDCCH is monitored also in the different CORESET. For example, if the specific CORESET is the first CORESET, the different CORESET may be the second CORESET.

<Overlap Handling and Complexity Handling>

The present disclosure has described a priority rule and PDCCH mapping rule for a case when CORESETs with different TCI states are overlapped in the time domain. In NR, a priority rule and a PDCCH mapping rule based on blind detection and channel estimation complexity are additionally defined, and when blind decoding and channel estimation that exceed a predefined limit in a specific slot are configured, a technique for mapping a PDCCH according to the priority rule is defined.

The present disclosure describes a PDCCH mapping rule for overlap handling and an order of applying the PDCCH mapping rule for complexity handling.

If complexity handling is performed first before the overlap handling, the number of candidates set according to the blind decoding (BD)/channel estimation (CE) capability may be additionally reduced; therefore, UE capability may be wasted. Therefore, the present disclosure describes usually performing the PDCCH mapping rule for overlap handling first before the PDCCH mapping rule for complexity handling.

In some scenarios, it may be preferable to reduce the number of candidates as much as possible for the purpose of power saving. Therefore, the present disclosure additionally describes determining the PDCCH mapping rule to be performed first by the network (or implicitly). As one example, suppose the network indicates information about which PDCCH mapping rule is to be applied first through higher layer signaling, or the time at which a UE transitions to a power saving mode is determined from the same understanding between the network and the UE. If the UE satisfies a condition for transitioning to the power saving mode, the UE may first perform the PDCCH mapping rule for complexity handling and then perform the PDCCH mapping rule for overlap handling.

Figure 17:
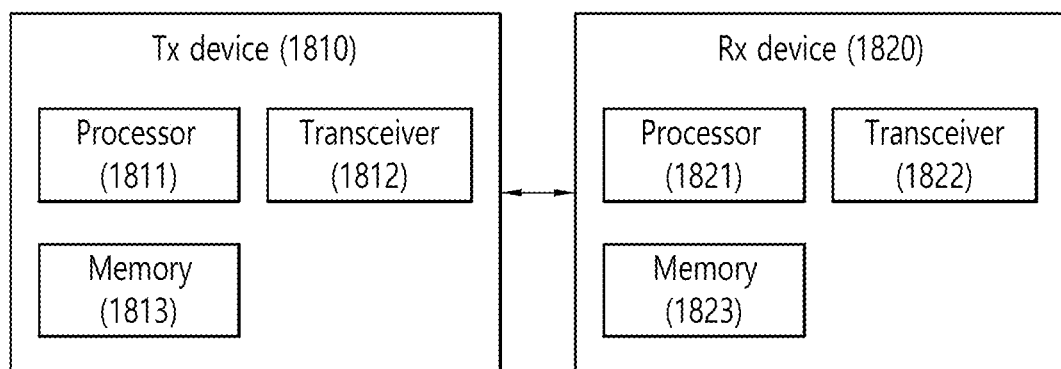
FIG. 17 is a block diagram showing an example of components of a transmitting device and a receiving device for implementing the present disclosure.

FIG. 17 is a block diagram showing an example of components of a transmitting device 1810 and a receiving device 1820 for implementing the present disclosure. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, and at least one memory, such as memories 1813 and 1823, for storing various types of information regarding communication in a wireless communication system. The transmitting device 1810 and the receiving device 1820 may also each implement at least one processor, such as processors 1811 and 1821, that are connected to components such as the transceivers 1812 and 1822 and the memories 1813 and 1823 and configured to control the memories 1813 and 1823 and/or the transceivers 1812 and 1822 such that the corresponding devices perform at least one of implementations of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an implementation of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 18:
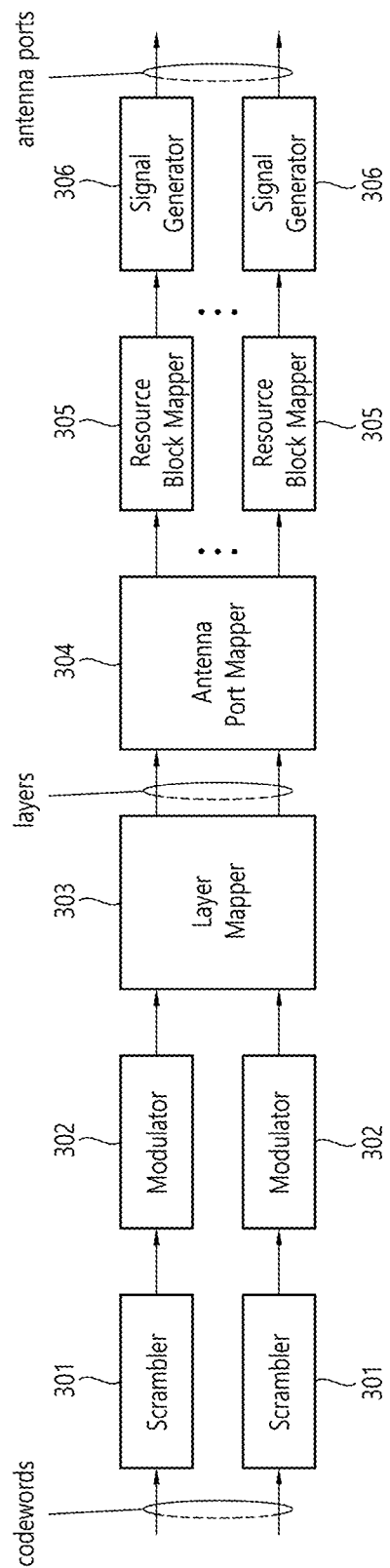
FIG. 18 illustrates an example of a signal processing module structure in the transmitting device.

FIG. 18 illustrates an example of a signal processing module structure in the transmitting device 1810. Here, signal processing can be performed by at least one processor of a base station/terminal, such as the processors 1811 and 1821 of FIG. 17.

Referring to FIG. 18, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 19:
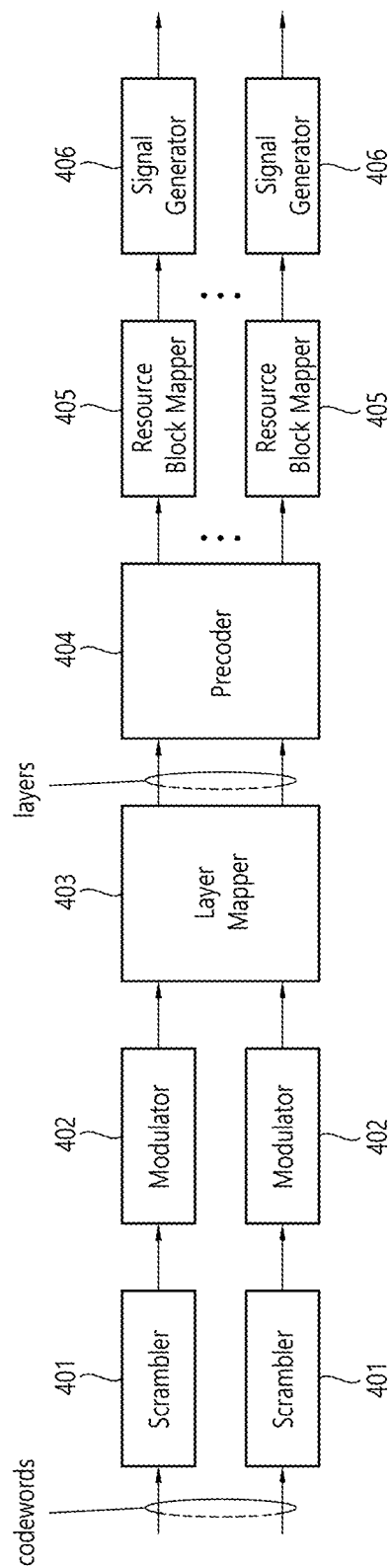
FIG. 19 illustrates another example of the signal processing module structure in the transmitting device.

FIG. 19 illustrates another example of the signal processing module structure in the transmitting device 1810. Here, signal processing can be performed by at least one processor of a terminal/base station, such as the processors 1811 and 1821 of FIG. 17.

Referring to FIG. 19, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 20:
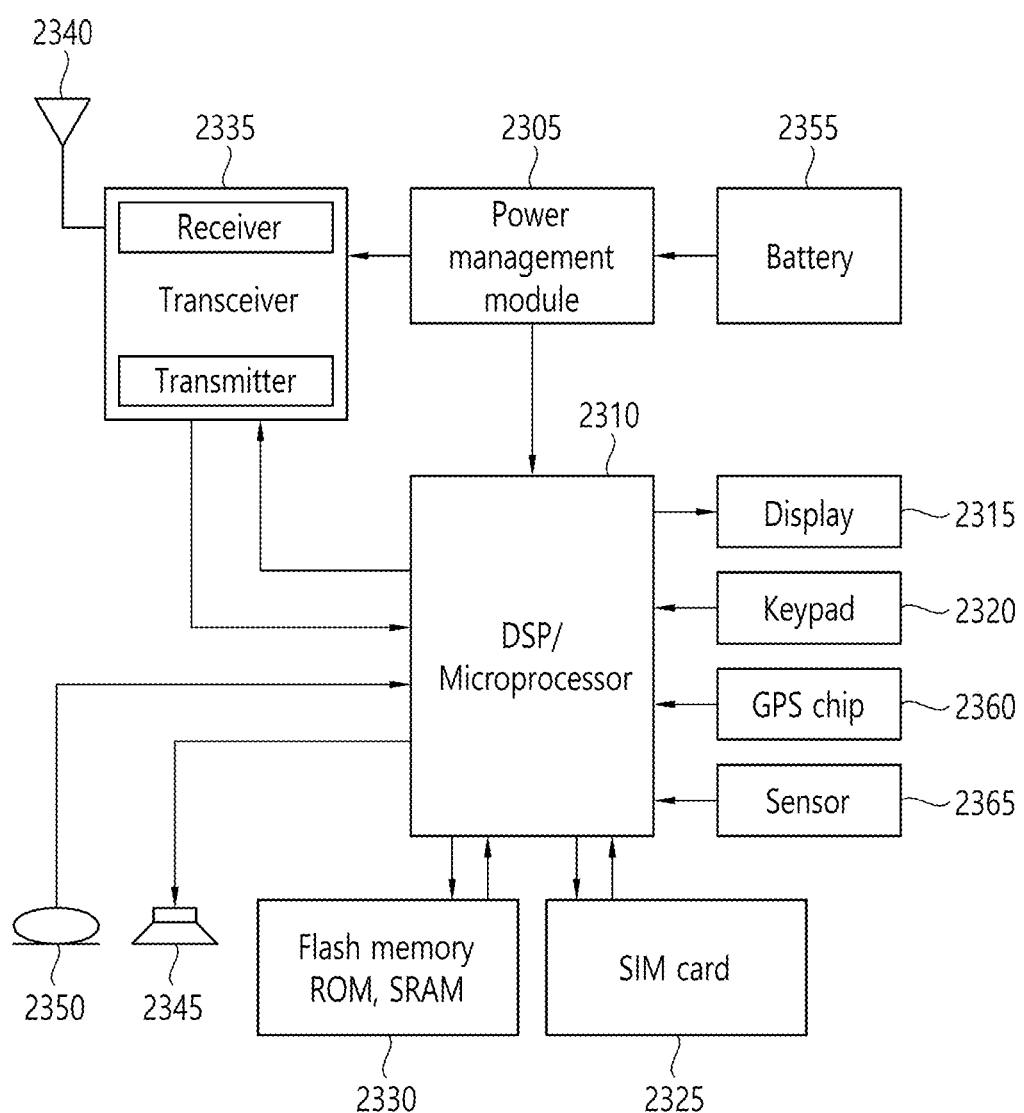
FIG. 20 illustrates an example of a wireless communication device according to an implementation example of the present disclosure.

FIG. 20 illustrates an example of a wireless communication device according to an implementation example of the present disclosure.

Referring to FIG. 20, the wireless communication device, for example, a terminal may include, for example, at least one processor such as processor 2310, which may be a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, at least one memory such as memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 20 may be the processors 1811 and 1821 in FIG. 17.

The memory 2330 is connected to the processor 2310 and stores information related to operations of the processor. The memory may be located inside or outside the processor and connected to the processor through various techniques such as wired connection and wireless connection. The memory 2330 in FIG. 20 may be the memories 1813 and 1823 in FIG. 17.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 20 may be the transceivers 1812 and 1822 in FIG. 17.

Although not shown in FIG. 20, various components such as a camera and a universal serial bus (USB) port may be additionally included in the terminal. For example, the camera may be connected to the processor 2310.

FIG. 20 is an example of implementation with respect to the terminal and implementation examples of the present disclosure are not limited thereto. The terminal need not essentially include all the components shown in FIG. 20. That is, some of the components, for example, the keypad 2320, the GPS chip 2360, the sensor 2365 and the SIM card 2325 may not be essential components. In this case, they may not be included in the terminal.

Figure 21:
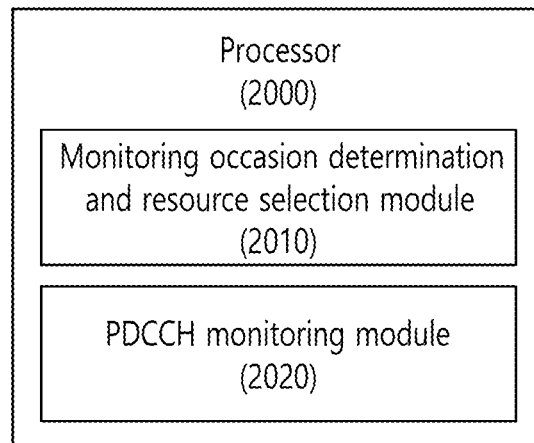
FIG. 21 illustrates an example of a processor on the side of a terminal.

FIG. 21 illustrates an example of a processor at the UE side.

The processor 2000 may include a monitoring occasion determination and resource selection module 2010 and a PDCCH monitoring module 2020. The processor 2000 may correspond to the processor of FIGS. 17 to 20.

The monitoring occasion determination and resource selection module 2010 may detect whether PDCCH monitoring occasions are overlapped in a plurality of CORESETs and if the PDCCH monitoring occasions are overlapped, may select at least one CORESET among the plurality of CORESETs.

The PDCCH monitoring module 2020 may monitor a PDCCH only in the selected at least one CORESET among the plurality of CORESETs.

Figure 22:
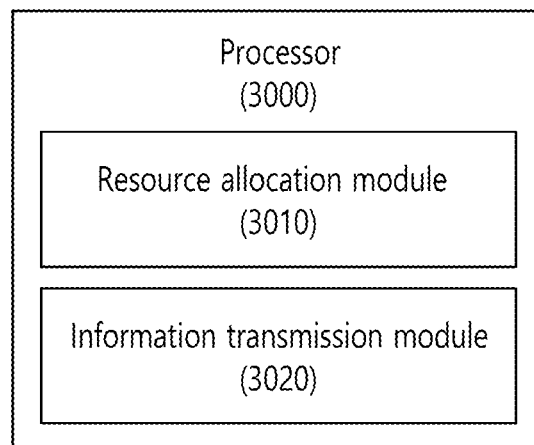
FIG. 22 illustrates an example of a processor on the side of a base station.

FIG. 22 illustrates an example of a processor at the gNB side.

The processor 3000 may include a resource allocation module 3010 and an information transmission module 3020. The processor 3000 may correspond to the processor of FIGS. 17 to 20.

The resource allocation module 3010 may allocate a plurality of CORESETs to a UE. The information transmission module 3020 may transmit a PDCCH only to a specific CORESET among the plurality of CORESETs.

What is claimed is:

1. A method of monitoring a control signal in a wireless communication system, the method performed by a user equipment (UE) and comprising:
    receiving, from a base station (BS), a synchronization signal/physical broadcast channel block (SSB);
    determining a plurality of control resource sets (CORESETs) in which there is overlap between physical downlink control channel (PDCCH) monitoring occasions;
    selecting a first CORESET, among the plurality of CORESETs, for monitoring;
    determining that a first CSI-RS of the first CORESET is related with the SSB;
    determining that a second CSI-RS of a second CORESET, among the plurality of CORESETs, is also related with the SSB; and
    based on the first CSI-RS of the first CORESET and the second CSI-RS of the second CORESET both being related with the SSB: monitoring at least one PDCCH in both the first CORESET and in the second CORESET.

2. The method of claim 1, wherein, in selecting the first CORESET, a first priority of a CORESET that includes a Common Search Space (CS S) is higher than a second priority of a CORESET that includes a UE-specific Search Space (USS).

3. The method of claim 1, wherein selecting the first CORESET comprises:
    based on the plurality of CORESETs comprising multiple CORESETs that include a CSS:
    selecting a CORESET, among the multiple CORESETs that include the CSS, with a smallest index.

4. The method of claim 1, wherein selecting the first CORESET comprises:
    selecting, among the plurality of CORESETs, a CORESET that corresponds to a CSS having a lowest index, from a cell that has a smallest cell index and that contains the CSS.

5. The method of claim 1, wherein the first CORESET and the second CORESET are assumed by the UE to have same Quasi Co Location (QCL) properties.

6. The method of claim 5, wherein the QCL properties are related to a spatial receive (Rx) parameter.

7. A user equipment (UE), the UE comprising:
    a transceiver;
    at least one processor; and
    at least one computer memory operably connectable to the at least one processor and storing instructions that, when executed by the at least one processor, perform operations comprising:
    receiving, from a base station (BS), a synchronization signal/physical broadcast channel block (SSB);
    determining a plurality of control resource sets (CORESETs) in which there is overlap between physical downlink control channel (PDCCH) monitoring occasions;
    selecting a first at least one CORESET, among the plurality of CORESETs, for monitoring;
    determining that a first CSI-RS of the first CORESET is related with the SSB;
    determining that a second CSI-RS of a second CORESET, among the plurality of CORESETs, is also related with the SSB; and
    based on the first CSI-RS of the first CORESET and the second CSI-RS of the second CORESET both being related with the SSB: monitoring at least one PDCCH in both the first CORESET and in the second CORESET.

8. The UE of claim 7, wherein, in selecting the first CORESET, a first priority of a CORESET that includes a Common Search Space (CSS) is higher than a second priority of a CORESET that includes a UE-specific Search Space (USS).

9. The UE of claim 7, wherein selecting the first CORESET comprises:
    based on the plurality of CORESETs comprising multiple CORESETs that include a CSS:
    selecting a CORESET, among the multiple CORESETs that include the CSS, with a smallest index.

10. The UE of claim 7, wherein selecting the first CORESET comprises:
    selecting, among the plurality of CORESETs, a CORESET that corresponds to a CSS having a lowest index, from a cell that has a smallest cell index and that contains the CSS.

11. The UE of claim 7, wherein the first CORESET and the second CORESET are assumed by the UE to have same Quasi Co Location (QCL) properties.

12. The UE of claim 11, wherein the QCL properties are related to a spatial receive (Rx) parameter.

13. At least one processor that is configured to control a wireless communication device to perform operations comprising:
    receiving, from a base station (BS), a synchronization signal/physical broadcast channel block (SSB);
    determining a plurality of control resource sets (CORESETs) in which there is overlap between physical downlink control channel (PDCCH) monitoring occasions;

selecting a first at least one CORESET, among the plurality of CORESETs, for monitoring;

determining that a first CSI-RS of the first CORESET is related with the SSB;

determining that a second CSI-RS of a second CORESET, among the plurality of CORESETs, is also related with the SSB; and based on the first CSI-RS of the first CORESET and the second CSI-RS of the second CORESET both being related with the SSB: monitoring at least one PDCCH in both the first CORESET and in the second CORESET.

* * * * *